US008732195B2

(12) United States Patent
Skeen et al.

(10) Patent No.: US 8,732,195 B2
(45) Date of Patent: May 20, 2014

(54) MULTI-MEDIA MANAGEMENT, STREAMING, AND ELECTRONIC COMMERCE TECHNIQUES IMPLEMENTED OVER A COMPUTER NETWORK

(71) Applicant: Opus Deli, Inc., Berkeley, CA (US)

(72) Inventors: Wayne Donald Maddock Skeen, Berkeley, CA (US); Christopher Thomas Ross, Berkeley, CA (US); Howard Gregg Cockrill, Oakland, CA (US); Sara Anne Mertz, Berkeley, CA (US); Matthew Paul Smith, Berkeley, CA (US); David Mendel Mayeri, Orinda, CA (US)

(73) Assignee: Opus Deli, Inc., Emeryville, CA (US)

( * ) Notice: Subject to any disclaimer, the term of this patent is extended or adjusted under 35 U.S.C. 154(b) by 0 days.

(21) Appl. No.: 13/844,672

(22) Filed: Mar. 15, 2013

(65) Prior Publication Data
US 2013/0339374 A1   Dec. 19, 2013

Related U.S. Application Data

(63) Continuation-in-part of application No. 13/517,505, filed on Jun. 13, 2012.

(60) Provisional application No. 61/713,582, filed on Oct. 14, 2012.

(51) Int. Cl.
*G06F 17/30* (2006.01)
*G06Q 10/00* (2012.01)
*G06Q 30/00* (2012.01)

(52) U.S. Cl.
USPC ........... 707/769; 707/736; 707/803; 709/201; 709/231; 715/727; 715/719; 715/716; 705/5; 705/26.1; 705/14.23

(58) Field of Classification Search
CPC ..................... G06F 17/30743; G06F 17/30749; G06F 17/30772; G06Q 10/02; G10H 2240/125

USPC .................. 707/736, 769, 803; 709/201, 231; 715/716, 719, 727; 705/14.23, 14.38, 705/14.58, 26.1, 27.1
See application file for complete search history.

(56) References Cited

U.S. PATENT DOCUMENTS 6,925,458 B2 * 8/2005 Scaturro et al. ..................... 1/1
7,693,978 B2 * 4/2010 Eliason et al. ............... 709/223

(Continued)

OTHER PUBLICATIONS

Roger Zimmermann, Elaine Chew, Sakire Arslan, Moses Pawar (University of Southern California), "Distributed Musical Performances: Architecture and Stream Management", ACM Transactions on Multimedia Computing, Communications and Applications, vol. 4, No. 2, May 2008, pp. 1-23.*

(Continued)

*Primary Examiner* — Cheryl Lewis
(74) *Attorney, Agent, or Firm* — EcoTech Law Group, P.C.; Dean E. Wolf, Esq.

(57) ABSTRACT

Various aspects described or referenced herein are directed to different methods, systems, and computer program products relating to multi-media management and streaming techniques implemented over a computer network. In one embodiment, a Multi-Media Management and Streaming (MMMS) System may be configured or designed to provide online users with "location based" streaming radio functionality. Users from different geographic locations may access a variety of MMMS System GUIs to search for, create, and/or share customized streaming radio stations which may be configured to identify and play/stream music associated with one or more artists/bands, songs, venues, and/or events. Another aspect disclosed herein is directed to different methods, systems, and computer program products providing ticketing reservation and purchasing functionality for enabling and/or facilitating users in performing activities/operations relating to reservation and/or purchasing of tickets to events such as live performances at one or more venues.

24 Claims, 11 Drawing Sheets

(56) References Cited

U.S. PATENT DOCUMENTS

| | | | |
|---|---|---|---|
| 7,720,871 | B2 | 5/2010 | Rogers et al. |
| 8,392,206 | B2 * | 3/2013 | Parekh et al. .................. 705/1.1 |
| 2003/0076963 | A1 * | 4/2003 | Wells .............................. 381/1 |
| 2004/0093325 | A1 | 5/2004 | Banerjee et al. |
| 2007/0156664 | A1 | 7/2007 | Norton et al. |
| 2008/0104627 | A1 * | 5/2008 | Avedissian ...................... 725/25 |
| 2009/0144244 | A1 | 6/2009 | Maghoul et al. |
| 2012/0047077 | A1 * | 2/2012 | Humphrey .................... 705/300 |
| 2012/0330697 | A1 * | 12/2012 | Smith et al. ........................ 705/5 |
| 2014/0032325 | A1 * | 1/2014 | Weiss et al. ................ 705/14.58 |

OTHER PUBLICATIONS

Yves Raimond, Christopher Sutton, and Mark Sandler, "The Many Faces of Semantics: Interlinking Music-Related Data on the Web", IEEE, 2009, pp. 1-12.*

Alain B. Renaud, Alexander Corot, and Pedro Rebelo, "Networked Music Performance: State of the Art", AES 30th International Conference, Saariselka, Finland, Mar. 15-17, 2007, pp. 1-7.*

PCT International Search Report, PCT Application No. PCT/US2012/042306, International Filing Date Jun. 13, 2012, Search report mailed Dec. 18, 2012.

PCT International Written Opinion, PCT Application No. PCT/US2012/042306, International Filing Date Jun. 13, 2012, Search report mailed Dec. 18, 2012.

www.8Tracks.com, website printout, printed Jun. 20, 2012.
www.artistgrowth.com, website printout, Jun. 20, 2012.
www.bandcamp.com, website printout, Jun. 20, 2012.
www.bandsintown.com, website printout, Jun. 20, 2012.
www.earbits.com, website printout, Jun. 20, 2012.
www.grooveshark.com website printout, Jun. 20, 2012.
www.iheart.com, website printout, Jun. 20, 2012.
www.jango.com, website printout, Jun. 20, 2012.
www.last.fm, website printout Jun. 20, 2012.
https://apps.facebook.com/concertcalendar/#_=_, website printout Jun. 20, 2012.
https://mog.com, website printout Jun. 20, 2012.
www.myspace.com, website printout Jun. 20, 2012.
www.pandora.com, website printout Jun. 20, 2012.
www.rdio.com, website printout Jun. 20, 2012.
www.reverbnation.com, website printout Jun. 20, 2012.
www.slacker.com, website printout Jun. 20, 2012.
www.getsongbird.com, website printout Jun. 20, 2012.
www.songza.com, website printout Jun. 20, 2012.
www.soundcloud.com, website printout Jun. 20, 2012.
www.spotify.com/us/desktop-splash/?utm_source=spotify&utm_medium=web&utm_campaign=start, website printout Jun. 20, 2012.
www.turntable.fm, website printout Jun. 20, 2012.

* cited by examiner

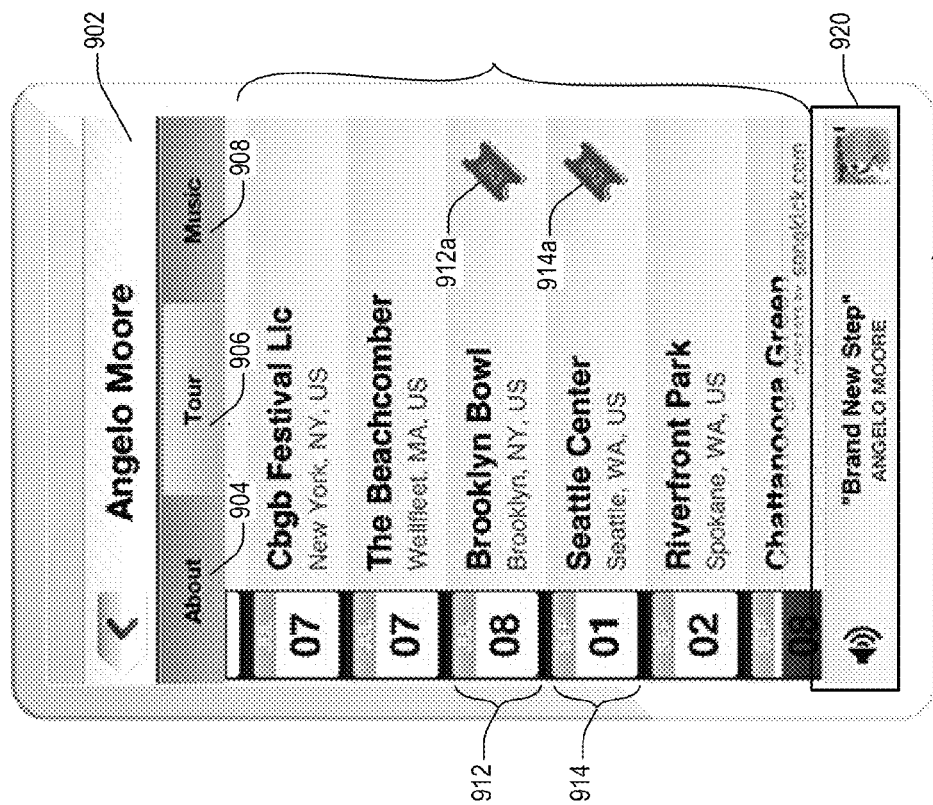
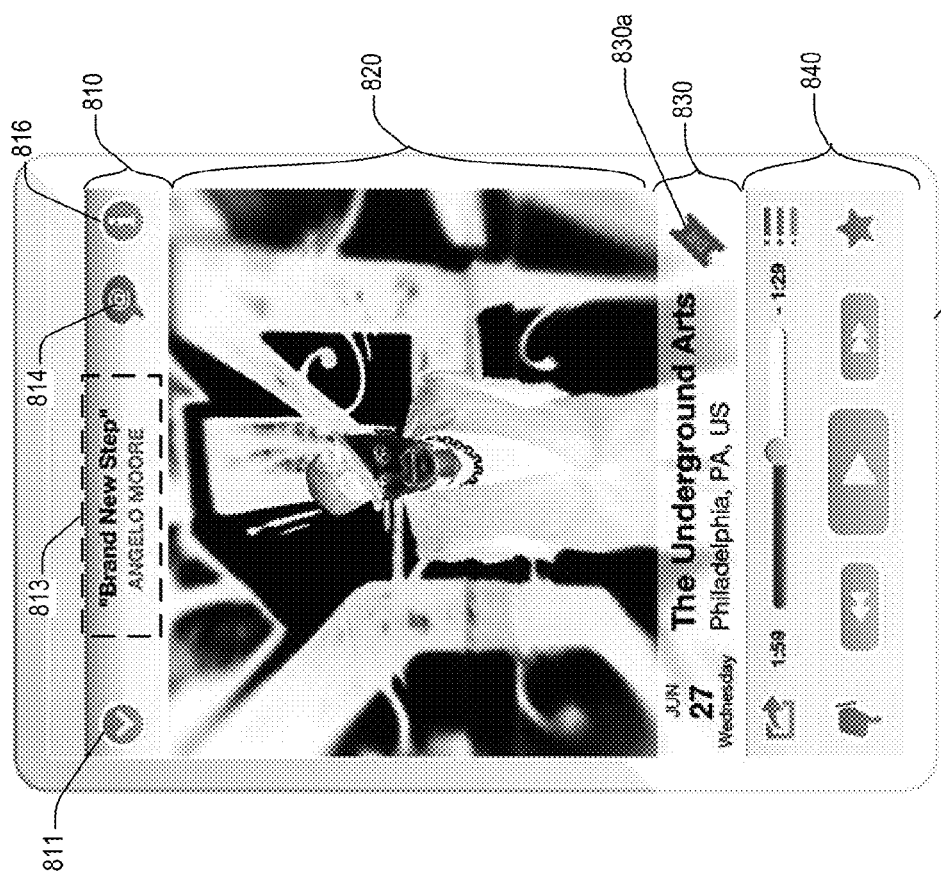
Fig. 9
Fig. 8

MULTI-MEDIA MANAGEMENT, STREAMING, AND ELECTRONIC COMMERCE TECHNIQUES IMPLEMENTED OVER A COMPUTER NETWORK

RELATED APPLICATION DATA

The present application claims benefit, pursuant to the provisions of 35 U.S.C. §119, of U.S. Provisional Application Ser. No. 61/713,582, titled "MULTI-MEDIA MANAGEMENT, STREAMING, AND ELECTRONIC COMMERCE TECHNIQUES IMPLEMENTED OVER A COMPUTER NETWORK", naming Skeen et al. as inventors, and filed 14 Oct. 2012, the entirety of which is incorporated herein by reference for all purposes.

This application is a continuation-in-part application, pursuant to the provisions of 35 U.S.C. §120, of prior U.S. patent application Ser. No. 13/517,505, titled "MULTI-MEDIA MANAGEMENT AND STREAMING TECHNIQUES IMPLEMENTED OVER A COMPUTER NETWORK", naming SKEEN, et. al. as inventors, and filed 13 Jun. 2012, the entirety of which is incorporated herein by reference for all purposes.

BACKGROUND

The present disclosure relates to network-based information searching and content delivery. More particularly, the present disclosure relates to multi-media management and streaming techniques implemented over a computer network.

BRIEF DESCRIPTION OF THE DRAWINGS

FIGS. 8-15 illustrate example screenshots of various graphical user interfaces (GUIs) which may be used to facilitate, initiate and/or perform various operation(s) and/or action(s) relating to one or more of the MMMS aspects disclosed or referenced herein.

DETAILED DESCRIPTION OF EXAMPLE EMBODIMENTS

Overview

Figure 1:
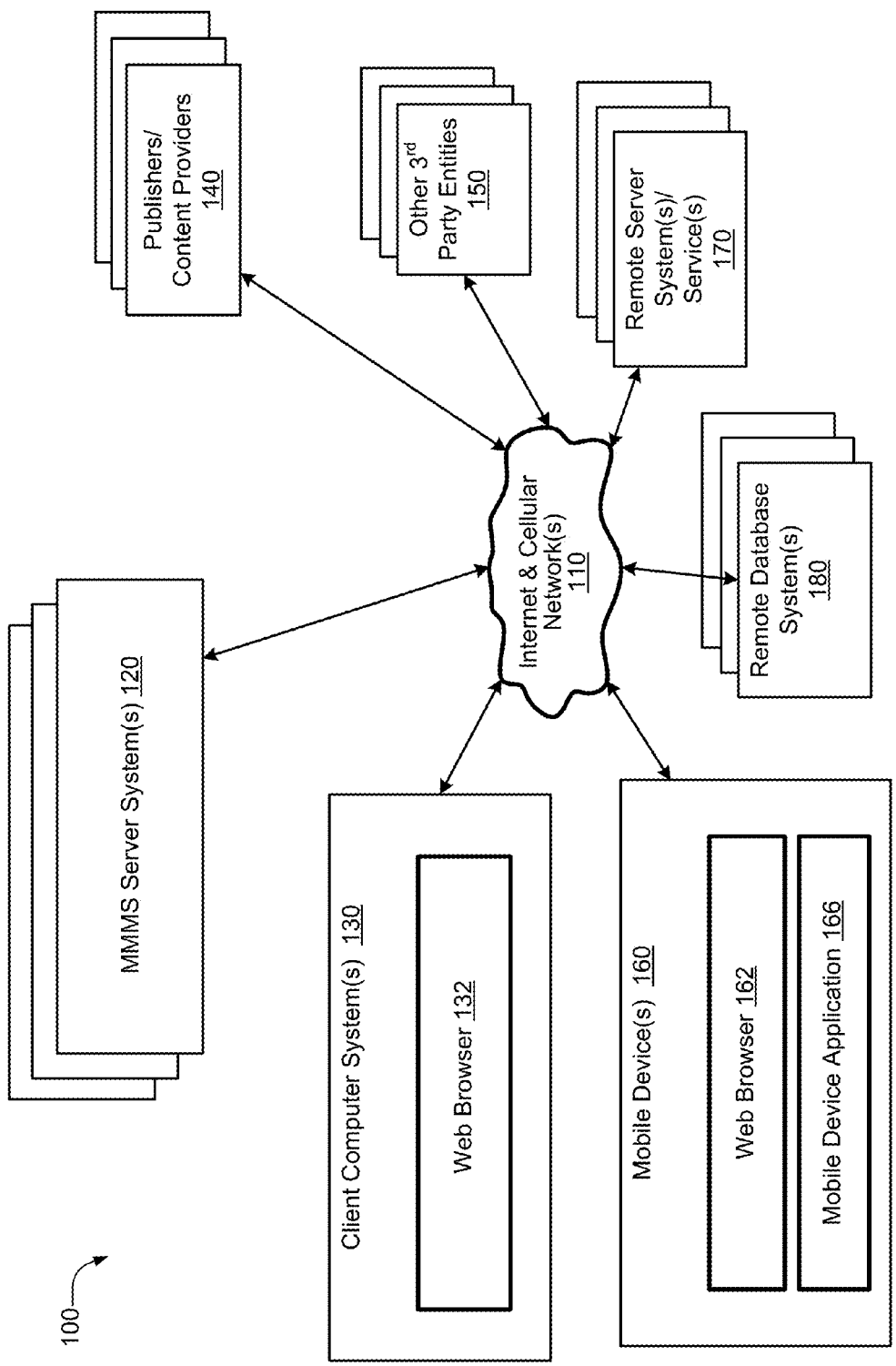
FIG. 1 illustrates a simplified block diagram of a specific example embodiment of a Multi-Media Management and Streaming (MMMS) System 100 which may be implemented in network portion 100.

Various aspects described or referenced herein are directed to different methods, systems, and computer program products relating to multi-media management and streaming techniques implemented over a computer network.

One aspect disclosed herein is directed to different methods, systems, and computer program products providing ticketing reservation and purchasing functionality for enabling and/or facilitating users in performing activities/operations relating to reservation and/or purchasing of tickets to events such as live performances at one or more venues. For example, in at least one embodiment, the DeliRadio System may include a Ticketing Reservation/Purchase System ("TRPS") which, for example, may be configured or designed to automatically and/or dynamically identify event ticketing reservation/purchasing opportunities in advance of tickets going on sale to the public.

Various graphical user interfaces (GUIs) are described herein which may be used to facilitate, initiate and/or perform various operation(s) and/or action(s) relating event ticket reservations and purchasing operations implemented via a user's mobile device. According to specific embodiments, at least a portion of the content and functionality of ticked reservation and purchasing GUIs disclosed herein may be implemented at the DeliRadio System.

Additional objects, features and advantages of the various aspects described or referenced herein may become apparent from the following description of its preferred embodiments, which description may be taken in conjunction with the accompanying drawings.

Specific Example Embodiments

Various techniques will now be described in detail with reference to a few example embodiments thereof as illustrated in the accompanying drawings. In the following description, numerous specific details are set forth in order to provide a thorough understanding of one or more aspects and/or features described or reference herein. It will be apparent, however, to one skilled in the art, that one or more aspects and/or features described or reference herein may be practiced without some or all of these specific details. In other instances, well known process steps and/or structures have not been described in detail in order to not obscure some of the aspects and/or features described or reference herein.

One or more different inventions may be described in the present application. Further, for one or more of the invention(s) described herein, numerous embodiments may be described in this patent application, and are presented for illustrative purposes only. The described embodiments are not intended to be limiting in any sense. One or more of the invention(s) may be widely applicable to numerous embodiments, as is readily apparent from the disclosure. These embodiments are described in sufficient detail to enable those skilled in the art to practice one or more of the invention(s), and it is to be understood that other embodiments may be utilized and that structural, logical, software, electrical and other changes may be made without departing from the scope of the one or more of the invention(s). Accordingly, those skilled in the art will recognize that the one or more of the invention(s) may be practiced with various modifications and alterations. Particular features of one or more of the invention(s) may be described with reference to one or more particular embodiments or figures that form a part of the present disclosure, and in which are shown, by way of illustration, specific embodiments of one or more of the invention(s). It should be understood, however, that such features are not limited to usage in the one or more particular embodiments or figures with reference to which they are described.

The present disclosure is neither a literal description of all embodiments of one or more of the invention(s) nor a listing of features of one or more of the invention(s) that must be present in all embodiments.

Headings of sections provided in this patent application and the title of this patent application are for convenience only, and are not to be taken as limiting the disclosure in any way.

Devices that are in communication with each other need not be in continuous communication with each other, unless expressly specified otherwise. In addition, devices that are in communication with each other may communicate directly or indirectly through one or more intermediaries.

A description of an embodiment with several components in communication with each other does not imply that all such components are required. To the contrary, a variety of optional components are described to illustrate the wide variety of possible embodiments of one or more of the invention(s).

Further, although process steps, method steps, algorithms or the like may be described in a sequential order, such processes, methods and algorithms may be configured to work in alternate orders. In other words, any sequence or order of steps that may be described in this patent application does not, in and of itself, indicate a requirement that the steps be performed in that order. The steps of described processes may be performed in any order practical. Further, some steps may be performed simultaneously despite being described or implied as occurring non-simultaneously (e.g., because one step is described after the other step). Moreover, the illustration of a process by its depiction in a drawing does not imply that the illustrated process is exclusive of other variations and modifications thereto, does not imply that the illustrated process or any of its steps are necessary to one or more of the invention(s), and does not imply that the illustrated process is preferred.

When a single device or article is described, it will be readily apparent that more than one device/article (whether or not they cooperate) may be used in place of a single device/article. Similarly, where more than one device or article is described (whether or not they cooperate), it will be readily apparent that a single device/article may be used in place of the more than one device or article.

The functionality and/or the features of a device may be alternatively embodied by one or more other devices that are not explicitly described as having such functionality/features. Thus, other embodiments of one or more of the invention(s) need not include the device itself.

Techniques and mechanisms described or reference herein will sometimes be described in singular form for clarity. However, it should be noted that particular embodiments include multiple iterations of a technique or multiple instantiations of a mechanism unless noted otherwise.

Various aspects described or referenced herein are directed to different methods, systems, and computer program products relating to multi-media management and streaming techniques implemented over a computer network. According to various embodiments disclosed herein, a Multi-Media Management and Streaming (MMMS) System may be configured or designed to provide online users with "location based" streaming radio functionality. Users from different geographic locations may access a variety of MMMS System GUIs to search for, create, and/or share customized streaming radio stations which may be configured to identify and play/stream music associated with one or more of the following (or combinations thereof):

Upcoming shows;
Bands/Artists;
Venue related events;
Online streaming radio stations;
Online streaming video stations;
Etc.

In at least one embodiment, the MMMS System may include functionality for enabling users to selectively filter search results and/or presented content according to a variety of different filtering criteria such as, for example, one or more of the following (or combinations thereof):

geographic location;
geographic proximity;
time/date criteria;
venue name(s);
music genre(s);
video genre(s);
artist/band name(s)
user ID;
geographic location of artist/band origin (e.g., home town);
geographic location of upcoming shows and/or events;
geographic proximity of upcoming shows and/or events;
etc.

In at least some embodiments described herein, the terms "DeliRadio" and "DeliRadio System" may refer to one or more embodiments of the MMMS System (and/or portions thereof), such as, for example, those corresponding to the website system(s), GUI(s), and music streaming service(s) associated with the website domain DeliRadio.com (www.DeliRadio.com). Thus, for example, as used herein, the terms "MMMS System", "DeliRadio", and "DeliRadio System" may be used interchangeably, unless otherwise noted. Additionally, at least some embodiments described herein, the terms "Artist" or "Band" may be used interchangeably to refer to one or more of the following (or combinations thereof): music related artist(s)/band(s), songwriters, composers, performers, etc.

FIG. 1 illustrates a simplified block diagram of a specific example embodiment of a Multi-Media Management and Streaming (MMMS) System 100 which may be implemented in network portion 100. As described in greater detail herein, different embodiments of MMMS Systems may be configured, designed, and/or operable to provide various different types of operations, functionalities, and/or features generally relating to MMMS System technology. Further, as described in greater detail herein, many of the various operations, functionalities, and/or features of the MMMS System(s) disclosed herein may provide may enable or provide different types of advantages and/or benefits to different entities interacting with the MMMS System(s).

Figure 6:
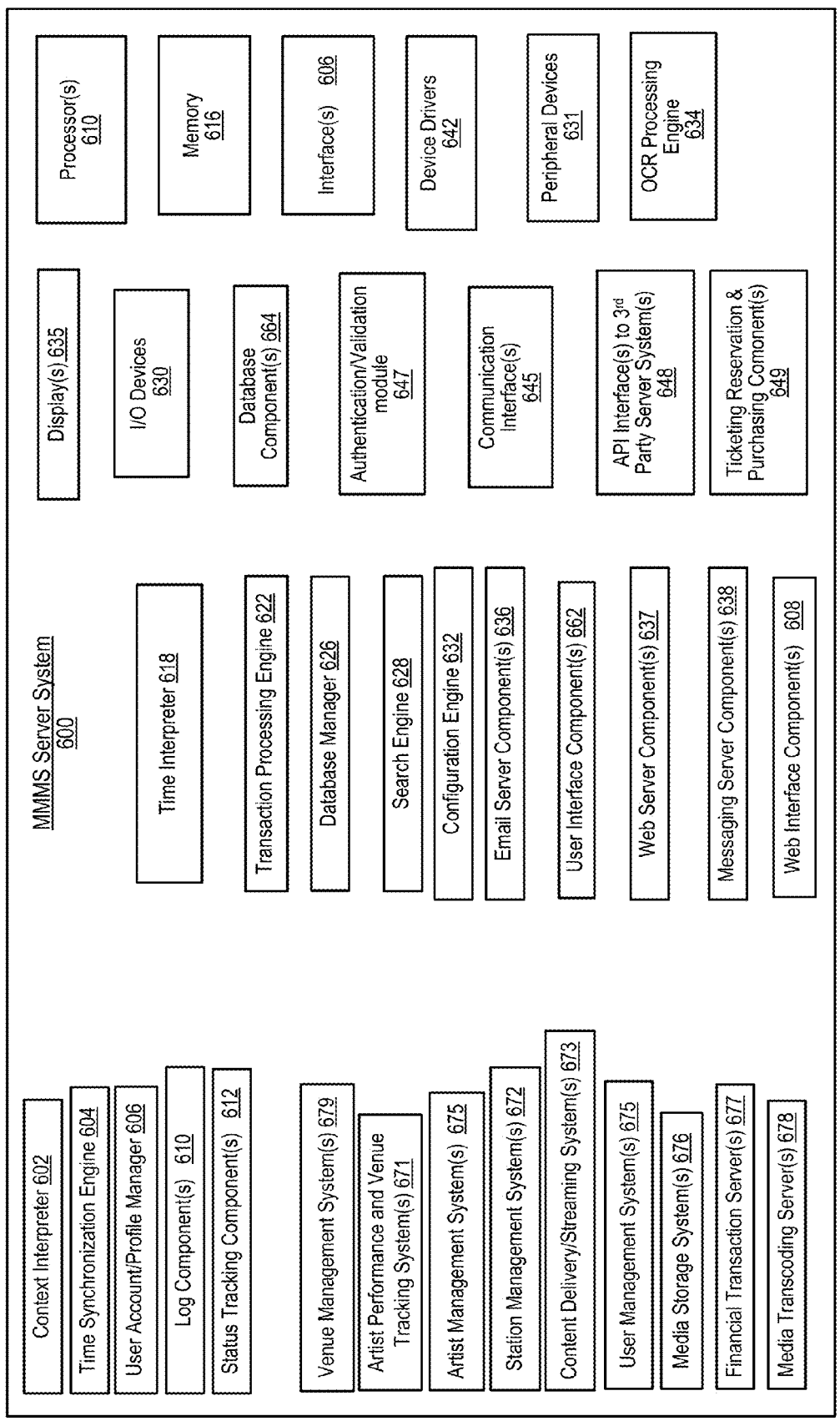
FIG. 6 illustrates an example of a functional block diagram of a MMMS Server System in accordance with a specific embodiment.

According to different embodiments, the MMMS System 100 may include a plurality of different types of components, devices, modules, processes, systems, etc., which, for example, may be implemented and/or instantiated via the use of hardware and/or combinations of hardware and software. For example, as illustrated in the example embodiment of FIG. 1, the MMMS System may include one or more of the following types of systems, components, devices, processes, etc. (or combinations thereof):

MMMS Server System(s) 120—In at least one embodiment, the MMMS Server System(s) may be operable to perform and/or implement various types of functions, operations, actions, and/or other features such as those described or referenced herein (e.g., such as those illustrated and/or described with respect to FIG. 6).

Publisher/Content Provider System component(s) 140. In at least one embodiment, one or more devices, components, and/or systems of the MMMS System (100) may be operable to interface with external content sources via an import/export API to load information into the various storage devices and database within the MMMS System (120).

Client Computer System (s) 130
3rd Party System(s)/Service(s) 150
Internet & Cellular Network(s) 110
Remote Database System(s)180
Remote Server System(s)170, which, for example, may include, but are not limited to, one or more of the following (or combinations thereof):
  Content provider servers/services
  Media Streaming servers/services
  Database storage/access/query servers/services
  Financial transaction servers/services
  Payment gateway servers/services
  Electronic commerce servers/services
  Event management/scheduling servers/services
  Etc.
Mobile Device(s) 160—In at least one embodiment, the Mobile Device(s) may be operable to perform and/or implement various types of functions, operations, actions, and/or other features such as those described or referenced herein (e.g., such as those illustrated and/or described with respect to FIG. 4). Additionally, in some embodiments, mobile devices which interact with the MMMS may offer additional unique functionality, including, but not limited to, temporal and geographic operations involving bands, events, users, and venues, enhanced social networking functionality, and photographic and videographic capture and transmission.
Etc.

In at least one embodiment, the MMMS System may be operable to utilize and/or generate various different types of data and/or other types of information when performing specific tasks and/or operations. This may include, for example, input data/information and/or output data/information. For example, in at least one embodiment, the MMMS System may be operable to access, process, and/or otherwise utilize information from one or more different types of sources, such as, for example, one or more local and/or remote memories, devices and/or systems. Additionally, in at least one embodiment, the MMMS System may be operable to generate one or more different types of output data/information, which, for example, may be stored in memory of one or more local and/or remote devices and/or systems. Examples of different types of input data/information and/or output data/information which may be accessed and/or utilized by the MMMS System may include, but are not limited to, one or more of those described and/or referenced herein.

According to specific embodiments, multiple instances or threads of the MMMS System may be concurrently implemented and/or initiated via the use of one or more processors and/or other combinations of hardware and/or hardware and software. For example, in at least some embodiments, various aspects, features, and/or functionalities of the MMMS System may be performed, implemented and/or initiated by one or more of the various systems, components, systems, devices, procedures, processes, etc., described and/or referenced herein.

In at least one embodiment, a given instance of the MMMS System may access and/or utilize information from one or more associated databases. In at least one embodiment, at least a portion of the database information may be accessed via communication with one or more local and/or remote memory devices. Examples of different types of data which may be accessed by the MMMS System may include, but are not limited to, one or more of those described and/or referenced herein.

According to different embodiments, various different types of encryption/decryption techniques may be used to facilitate secure communications between devices in MMMS System(s) and/or MMMS Network(s). Examples of the various types of security techniques which may be used may include, but are not limited to, one or more of the following (or combinations thereof): random number generators, SHA-1 (Secured Hashing Algorithm), MD2, MD5, DES (Digital Encryption Standard), 3DES (Triple DES), RC4 (Rivest Cipher), ARC4 (related to RC4), TKIP (Temporal Key Integrity Protocol, uses RC4), AES (Advanced Encryption Standard), RSA, DSA, DH, NTRU, and ECC (elliptic curve cryptography), PKA (Private Key Authentication), Device-Unique Secret Key and other cryptographic key data, SSL, etc. Other security features contemplated may include use of well known hardware-based and/or software-based security components, and/or any other known or yet to be devised security and/or hardware and encryption/decryption processes implemented in hardware and/or software.

According to different embodiments, one or more different threads or instances of the MMMS System may be initiated in response to detection of one or more conditions or events satisfying one or more different types of minimum threshold criteria for triggering initiation of at least one instance of the MMMS System. Various examples of conditions or events which may trigger initiation and/or implementation of one or more different threads or instances of the MMMS System may include, but are not limited to, one or more of those described and/or referenced herein.

It will be appreciated that the MMMS System of FIG. 1 is but one example from a wide range of MMMS System embodiments which may be implemented. Other embodiments of the MMMS System (not shown) may include additional, fewer and/or different components/features that those illustrated in the example MMMS System embodiment of FIG. 1.

Generally, the MMMS techniques described herein may be implemented in hardware and/or hardware+software. For example, they can be implemented in an operating system kernel, in a separate user process, in a library package bound into network applications, on a specially constructed machine, or on a network interface card. In a specific embodiment, various aspects described herein may be implemented in software such as an operating system or in an application running on an operating system.

Hardware and/or software+hardware hybrid embodiments of the MMMS techniques described herein may be implemented on a general-purpose programmable machine selectively activated or reconfigured by a computer program stored in memory. Such programmable machine may include, for example, mobile or handheld computing systems, PDA, smart phones, notebook computers, tablets, netbooks, desktop computing systems, server systems, cloud computing systems, network devices, etc.

Figure 2:
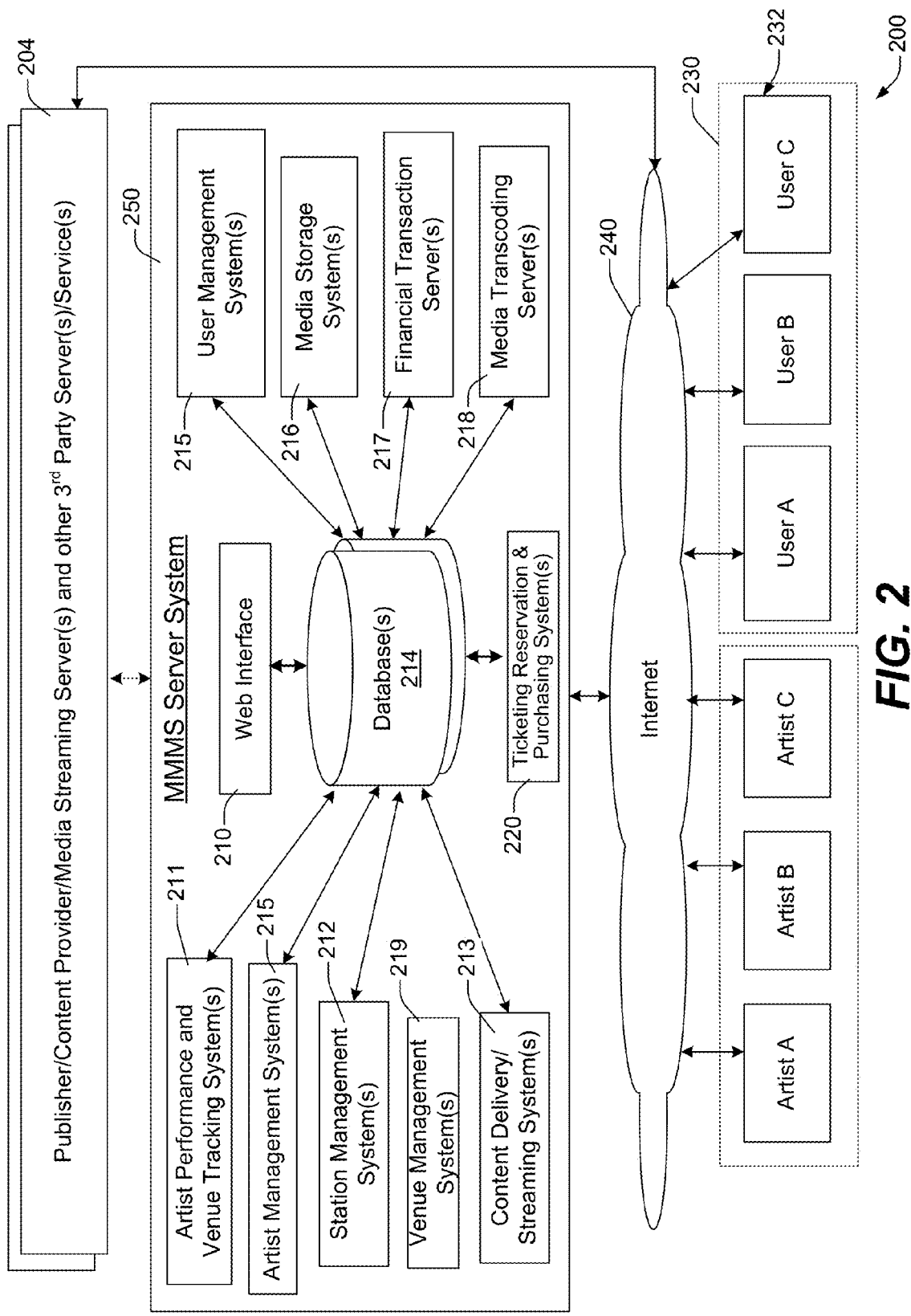
FIG. 2 shows a specific example embodiment of a network diagram illustrating an embodiment of an MMMS System 200.

FIG. 2 shows a specific example embodiment of a network diagram illustrating an embodiment of an MMMS System 200, which may be configured or designed for implementing various aspects, functions, and/or features such as one or more of those described and/or referenced herein. Additionally, the example embodiment of FIG. 2 provides an illustrative example of the different interactions and communication paths between and among the various components of the MMMS System network.

According to specific embodiments, the MMMS System may be accessible to various entities such as, for example: individual persons, corporate or business entities, system administrators, online content providers, online publishers, merchants, artists, copyright holders, etc.

In at least one embodiment, the MMMS System may include a plurality of hardware and/or software components operable to perform and/or implement various types of functions, operations, actions, and/or other features of the MMMS technology disclosed herein. Examples of such components may include, but are not limited to, one or more of the following (or combinations thereof):

MMMS Server System (e.g. 250).

Artist Performance and Venue Tracking System(s) 211, which, for example, may be configured or designed to facilitate, initiate and/or perform one or more of the following operation(s)/action(s) (or combinations thereof):

Manage database(s) of Event information.

Information about Events may be stored or cached, include artist(s), date(s) and venue(s), geographic location(s), photographs along with ticketing information, as well as additional fields.

Venue and Event data may be incorporated from external sources, using external API as available and permitted.

Accommodate discrepancies between internal and external databases and data.

Artist Management System(s) 215, which, for example, may be configured or designed to facilitate, initiate and/or perform one or more of the following operation(s)/action(s) (or combinations thereof):

Provide interfaces to, and manage database(s) for the purpose of storing, editing and distributing media and material relating to the Artist's identity, including but not limited to Albums, Tracks, Photographs, Video Links, Biographies, Tags, Locations, Comments, Reviews, Social Networks and Hyperlinks.

Once authenticated, Artists may easily edit their own information, and access statistics and analytics associated with their account from a central dashboard.

Artists may view the statistics and activities of their Stations, Tracks, Albums, email subscribers, and Radio Play.

Station Management System(s) 212, which, for example, may be configured or designed to facilitate, initiate and/or perform one or more of the following operation(s)/action(s) (or combinations thereof):

Store and cache 'Stations' of two types: Static and Dynamic.

Static Stations may include a ranked list of Artists, with no minimum or maximum number.

Dynamic Stations may include a "snapshot" of Filter Settings used when the Station was created or saved. At any point in time the Station may be refreshed, resulting in a new Ranked List of Artists recalculated from the most current MMMS databases, according to the Saved Filters.

MMMS may store or cache usage statistics and listenership data for one or more Stations Content Delivery/Streaming System(s) 213, which, for example, may be configured or designed to facilitate, initiate and/or perform one or more of the following operation(s)/action(s) (or combinations thereof): Serve digital content, including, but not limited to audio, video, images, or other documents to a variety of network enabled devices, including, but not limited to, desktop and laptop computers, PDAs, smart phones, tablets, iOS devices, or other external networks.

User Management System(s) 215, which, for example, may be configured or designed to facilitate, initiate and/or perform one or more of the following operation(s)/action(s) (or combinations thereof): Store information and usage statistics for several classes of User, including Visitors, Users, Artists, Venues, and Administrators Media Storage System(s) 216, which, for example, may be configured or designed to facilitate, initiate and/or perform one or more of the following operation(s)/action(s) (or combinations thereof): Employ sufficient and reliable digital storage, as is necessary to hold Artist Content in an organized fashion.

Financial Transaction Server(s) 217, which, for example, may be configured or designed to facilitate, initiate and/or perform one or more of the following operation(s)/action(s) (or combinations thereof): Provide servers or services related to the processing of financial transactions, through a variety of methods.

Media Transcoding Server(s) 218, which, for example, may be configured or designed to facilitate, initiate and/or perform one or more of the following operation(s)/action(s) (or combinations thereof): Receive digital audio content from Artists, and performing any operations that are necessary for operation of the MMMS system, and related subsystems.

Venue Management System(s) 219, which, for example, may be configured or designed to facilitate, initiate and/or perform one or more of the following operation(s)/action(s) (or combinations thereof): Provide interfaces to, and manage database(s) for the purpose of storing, editing and distributing media and material relating to the identity of a Venue, including but not limited to Calendar Information, Photographs, Video Links, Descriptions, Tags, Locations, Social Networks and Website. Once authenticated, Venues may easily edit their own information, and access statistics and analytics associated with their account from a central dashboard.

Ticketing Reservation and Purchasing System(s) (TRPS) 220, which, for example, may be configured or designed to facilitate, initiate and/or perform activities/operations relating to reservation and/or purchasing of tickets to events such as live performances at one or more venues.

According to different embodiments, at least some MMMS System(s) may be configured, designed, and/or operable to provide a number of different advantages and/or benefits and/or may be operable to initiate, and/or enable various different types of operations, functionalities, and/or features, such as, for example, one or more of the following (or combinations thereof):

"Shows Near" Geographic Location Stations Functionality

In at least one embodiment, MMMS System (also referred to herein as "DeliRadio") users may create geographic location specific (e.g., "city specific") streaming radio stations playing artists with upcoming live performances within the geographic location (e.g., San Francisco) specified by the user. Additionally, users may specify other filtering criteria (either separately or in different combinations) such as, for example, one or more of the following (or combinations thereof):

Geographic proximity or "radius" filtering criteria (e.g. "within 15 miles of Paris" or "within 50 miles of Chicago");

Time/Date filtering criteria (e.g. "tonight," "this week," "next 2 weeks," "all dates" or "custom dates" wherein a user specifies a specific date range such as between July $15^{th}$ and August $3^{rd}$);

"Genre" and/or "Tag" filtering criteria (e.g. folk, folk+rock, folk+rock but not experimental)

Venue specific filtering criteria (e.g., limit search results to events at The Fillmore (San Francisco) or The Great American Music Hall (San Francisco) or Yoshi's Jazz Club (Oakland)).

Artist/band specific filtering criteria (e.g., "The Cribs"; "STS9 or Mojomama"; etc.)

In at least one embodiment, when a user enters their filter criteria for a "Shows Near" Geographic Location search, DeliRadio searches its database (and/or remote database(s)) and automatically and dynamically generates (e.g., in real-time) at least one streaming radio station which will play only songs from artists who match the criteria. For example, "Folk Rock but not Experimental Artists with upcoming live performances in the next 2 weeks within 50 miles of Chicago."

Venue(s) Stations Functionality

In at least one embodiment, DeliRadio users may create "venue specific" streaming radio stations playing artists with upcoming live performances at one or more venues selected by the user. Users may also set "timeframe" filter criteria (e.g. "tonight," "this week," "next 2 weeks," "all dates" or "custom dates" wherein a user specifies a specific date range such as between July $15^{th}$ and August $3^{rd}$) Users may also set "genre" filter criteria (e.g. "folk," or "folk+rock," or "folk+rock but not experimental"). When a user enters their filter criteria for a Venue(s) Station, DeliRadio searches its database (and/or remote database(s)) and automatically and dynamically generates (e.g., in real-time) at least one streaming radio station playing only songs from artists who match the specified filter criteria. For example, using one or more DeliRadio GUIs, a user may initiate a filtered search for "Folk Rock but not Experimental Artists with upcoming live performances at The Fillmore, Great American Music Hall and Café Du Nord between July $15^{th}$ and August $3^{rd}$." In response, DeliRadio may search its database (and/or remote database(s)) and automatically and dynamically identify and display (e.g., in real-time) information relating to artists/bands and/or upcoming live performances which match the user specified filter criteria. Additionally, DeliRadio may identify songs of artists/bands which match the user specified filter criteria, and dynamically generate a streaming radio station which includes only songs from the identified artists who match the user specified filter criteria.

Hometown/Neighborhood Stations Functionality

In at least one embodiment, DeliRadio users may create "artist hometown / neighborhood" streaming radio stations which includes only those artists whose hometown or "homehood" matches a city or neighborhood specified by the user. Users may also specify geographic proximity (e.g., "radius") filter criteria (e.g. "within 15 miles of Paris" or "within 50 miles of Chicago"); and/or may also specify "genre" filter criteria (e.g. "folk," or "folk+rock," or "folk+rock but not experimental"). When a user enters their filter criteria for a Hometown/Home-hood Station. DeliRadio searches its database (and/or remote database(s)) and automatically and dynamically generates (e.g., in real-time) at least one streaming radio station for playing only songs by artists who match the criteria. For example, "Folk Rock but not Experimental Artists from within 5 miles of Moscow" or "Indie Singer-Songwriter but not Country Artists from the Lower East Side of New York City."

Artist/Show Recommendation Stations Functionality

In at least one embodiment, DeliRadio users may enter the name of one or more artist(s)/band(s) (herein the "Target Artist(s)") to create "recommendation" stations, where the "recommendation criteria" for the station is based primarily on live performance and tour information, such as, for example, one or more of the following (or combinations thereof):

(1) other artists who have performed with the Target Artist(s) in the past;
(2) other artists who are scheduled to perform with the Target Artist(s) in the future;
(3) other artists who have performed at the same venue(s) and/or festival(s) that the Target Artist(s) has performed at in the past; and/or
(4) other artists who are scheduled to perform in the future at the same venue(s) and/or festival(s) that the Target Artist(s) has performed at.

Additional "recommendation criteria" may include other filter criteria such as, for example, one or more of the following (or combinations thereof): other artists who have been "starred" by DeliRadio users who have also starred the Target Artist(s); genre and tag cross-matching filter criteria (e.g., specified by the user); play count and popularity within the DeliRadio System; geolocation based criteria (such as prioritizing other artists in the station based on upcoming concerts that are proximal to the listener); "similar artist" results which, for example, may be acquired from API calls to external databases (e.g. EchoNest, Last.FM); user created stations that include one or more of the Target Artist(s); etc.

Ticket Reservation Service Functionality

Venue Implementation: In at least one embodiment, the MMMS System may be configured or designed to provide ticketing reservation and purchasing functionality for enabling and/or facilitating users in performing activities/operations relating to reservation and/or purchasing of tickets to events such as live performances at one or more venues. For example, in at least one embodiment, the MMMS System may include a Ticketing Reservation/Purchase System ("TRPS") which may be configured or designed to automatically and/or dynamically identify event ticketing reservation/purchasing opportunities in advance of tickets going on sale to the public. In one embodiment, reservation and/or purchasing of tickets by DeliRadio users may be facilitated by $3^{rd}$ party system(s)/component(s). In at least one embodiment, at some point after the Initial Ticket On-Sale event (e.g., approximately 1-5 days after), the venue hosting the event (e.g., concert/show) would set the Reservation Allotment for how many reservations it would guarantee/allot for a specific concert. In one embodiment, to determine the Reservation Allotment, the venue may take their "Sellable Capacity" less "Anticipated Sales", and the remaining number may be the Anticipated Unsold Tickets ("AUTs"). For example, a venue with a Sellable Capacity of 500 and Anticipated Sales of 300 would have 200 AUTs remaining The TRPS would multiply the venue's AUT by a "super percent" multiplier (e.g., 100+%), thus creating the Reservation Allotment for the event. One reason for the super percentage multiplier is that not all reservations may be converted to a ticket purchase.

Customer Interaction: In at least one embodiment, once the Reservation Allotment is available in the TRPS, DeliRadio users may be able to view a Concert Page for a particular event. On the Concert Page, the user may view (e.g., in real-time) information relating to the total number of tickets sold for that event and the number of reservations available. DeliRadio users may be able to "buy now" for immediate ticket purchase and/or be able to make ticket reservations (e.g., for one or more persons). In one embodiment where DeliRadio users may "star" particular venues, DeliRadio users could receive an update when an event is scheduled at one of their starred venues, and by clicking on the update, they may be directed to the Concert Page for that event, where they could purchase tickets and/or make Reservations.

Making the Reservation: In at least one embodiment, when making the Reservation, the Reservation Host may be able to designate other DeliRadio users (Reservation Recipients) to receive an "invitation to accept the Reservation." This message may be sent within DeliRadio to Reservation Recipients. The Host and the Recipients would have a window of time in which to convert their Reservations into Ticket purchases. Once the Host has received confirmation from Recipients of their intent to attend the show as a group (e.g., via DeliRadio SMS, text message, phone call, in person, etc.), the Reservation Host may automatically handle the Ticket purchases on behalf of the Reservation Group.

Picking up Tickets purchased through TRPS: In at least one embodiment, the venue keeps track of tickets purchased through at least one Reservation Group in the TRPS. The Host of at least one Reservation Group is now "hosting" a "guest list" of attendees at the event. At least one member of the Reservation Group arrives at the venue, informs Will Call that they're on the Reservation Host's Guest List, presents ID, and receives their Ticket.

Reservation Incentives: In at least one embodiment, venues participating in the TRPS may be able to access their Venue Dashboard, select a particular event, and set any incentives/discounts it wants to offer for that event. The Reservation Host would then be eligible for deals as an incentive for buying AUTs in bulk, for example. In at least one embodiment, DeliRadio users who reserve or purchase their tickets via the DeliRadio System may receive other types of promotional offers or benefits such as, for example:

Bulk Ticket Discount: By way of example, 5 tickets for the price of 4, with the discount spread across the price of one or more tickets, thus benefiting the Reservation Group. The venue is only getting income from 4 ticket sales, but the event will be attended by 5 persons who may generate other income for the venue while attending the show.

Promotional Offers: drink tickets, venue swag, VIP privileges, priority seat reservations, discount coupons, etc.

Future Show Discounts: Discounts on Ticket purchases for future shows at that venue, or at shows among various venues in a Venue Group.

Vendor Affiliate Discounts: Discounts at vendors/merchants in the same neighborhood as the venue.

Venue "Points": Redeemable by the Host at the venue at some later date for any of the above.

TRPS Monetization: Monetization of the TRPS could take one or more of the following forms (or combinations thereof): Per Ticket Fee; Per Order Fee; and/or Per Show Fee.

Example Models for Sponsorship Sales: (1) local/national sponsor underwrites one or more fees and is perceived as paying one or more convenience fees related to Tickets purchased through the TRPS for that event, in exchange for brand goodwill and/or user data provided by DeliRadio; (2) local/national sponsor pays a flat fee per show to buy a relationship with a specific demographic and receives demographic specific user data from DeliRadio; (3) local/national sponsor pays a flat fee per show and offers product giveaways and/or raffle entries for a contest.

Example "Reservation" Definitions: (1) a socially broadcast interest in attending a particular event (e.g., a "like" for an event that others may see), and then helping that general interest culminate in a tipping point where everyone wants to convert their Reservation into Ticket Buys to be guaranteed admission; (2) an option to purchase a Ticket; (3) an opportunity for an individual to get a group of people to buy multiple tickets, and by doing so, the organizer (host) receives something of value from the venue; (4) a discrete unit of the allocation of Anticipated Unsold Tickets multiplied by a super-percentage (100+%)

According to different embodiments, a reservation window may close the sooner of (1) x days before the event or (2) X% of Tickets sold. Alternatively, X days after the Reservation is made, but no later than X days before the event.

Example Benefits/Advantages of MMMS System TRPS: Various benefits/advantages of the MMMS System TRPS may include, for example: the limited quantity of Reservations; the limited time window in which to convert Reservations into Ticket Buys; and/or the social broadcast nature of the Reservation (allowing one or more DeliRadio users to see the status of one or more Reservations for a given show at any time.

Functionality for Display of Relevant Gigs on a Per-User Geo-Location Basis

In at least one embodiment, when a DeliRadio station is created, information relating to the station may be displayed or presented to the user via a Pop-Out Player GUI which may include one or more of the following types of content and/or features (or combinations thereof):

Venue Station: if the station created is venue-specific, then the first concert date displayed for at least one artist in that station matches the concert scheduled to occur at the venue(s) selected in the user's search criteria.

Geographic proximity: if the station created is not venue-specific, and an artist in the station has an upcoming concert within a predetermined radius (e.g., 200 miles) of user's location (as determined by geo-locating the user's IP address or user's mobile device, for example), then that concert within 200 miles of the user is the first displayed concert.

Chronologically: if the station created is not venue-specific, and an artist in the station does not have an upcoming concert within the predetermined radius (e.g., 200 miles) of user's location (e.g., as determined by geo-located the user's IP Address or user's mobile device), then the concert that is occurring next chronologically is the first displayed concert.

Stations Map Overlay Functionality

In at least one embodiment, information relating to any given station created on DeliRadio may be selectively displayed according to the user's viewing preferences, such as, for example: "List View" (e.g., FIG. 11), "Tile View" (e.g., FIG. 12) or "Map View" (e.g., FIG. 13). In one embodiment, when a genre and/or hometown station is viewed in map view, at least one artist's hometown is plotted on a map (e.g., using "guitar pick" icons to indicate the location(s) on the displayed map), and a number inside the guitar pick indicating how many artists matching the search reside in that location (see, e.g., FIG. 13). When a DeliRadio Station for "shows near" city/neighborhood or one or more venues is created, the guitar pick icons indicate venue locations where a concert that matches the search criteria may take place, and the number inside the guitar pick indicate how many artists matching the search may perform at that venue. In either instance (hometown/genre stations or "shows near" city/venue stations), clicking on a displayed icon may open a small window listing the artists matching the overall search criteria who are located (or who have upcoming concerts located) in or near the location indicated by the corresponding selected icon. In at least one embodiment, each of the List View, Tile View, and Map View GUIs may also include a "Play Station" button which enables a user to create a new station which is automatically configured to play only songs from the artists displayed in the current window/GUI (and, in some embodiments, related artists as well).

For example, creating a DeliRadio Station of rock bands (without indicating a specific location) may include all rock bands on DeliRadio. The map view may initially only display rock bands within a certain radius of the user's IP Address or user's mobile device. The user may then zoom out to see one or more DeliRadio rock bands across the world, as indicated by guitar picks for at least one location. Clicking on a guitar pick over London, England, may reload the map view to focus only on London. Clicking on the guitar pick over London may open a window listing one or more the London rock bands. The user may then click the play button to hear only rock bands from London. This same example could be used for a "hometown" only station (e.g., indicating a search for one or more bands from a specific city or town) or a hybrid hometown/genre station (e.g., indicating a search for one or more bands of a specific genre (or genres) from a specific city or town).

For example, creating a DeliRadio Station of rock bands with upcoming shows within 100 miles of Amsterdam, Netherlands, when viewed in map view, may display one or more DeliRadio rock bands with upcoming shows in this radius around Amsterdam. In one embodiment, at least a portion of the displayed icons on the map may represent or indicate venues where one or more of the show(s) (matching the filtered search criteria) are to take place. In at least one embodiment, one or more displayed icons may each display a numerical value indicating the number of upcoming shows at that particular venue for which ticket reservations/purchases are currently available. In one embodiment, clicking on an icon may cause a Venue Info GUI to be displayed which includes information about one or more bands matching the search criteria at that particular venue. In one embodiment, a user may click a "Play" button displayed in the Venue Info GUI to dynamically generate a DeliRadio Station playing only those bands at that venue.

Gig Sharing (User-to-user) Functionality

In at least one embodiment, a user may select a particular concert/event from an artist's upcoming calendar, and share the event information (e.g., date, artists performing, location, ticket price, ticket purchase information, etc.) as well as content associated with the performing artists (e.g., audio recordings, photos, biographical information, website links, Facebook URLs, Twitter URLs, etc.) directly with other DeliRadio users (e.g., via DeliRadio's DeliRadio Mobile Applications and web applications), and associate a personal message from the sharer with the information shared. This would present an opportunity for the "sharer" and the "sharee(s)" to express their interest in attending the show together, whether by making plans offline or purchasing tickets online, including via the DeliRadio Ticket Reservation Service.

Social Blogging Functionality

By embedding the DeliRadio BloggerTool javascript in the <head>of their HTML pages, website operators may use DeliRadio to provide playable links next to the textual mention of any Artist Name that currently has music available for public streaming on DeliRadio. Clicking on a play link may launch the DeliRadio Pop-Out Player that may either play the single artist that was clicked on, or a DeliRadio Station comprising one or more artists (including the selected artist) with DeliRadio music on that web page. A single web page may include multiple instances of the DeliRadio BloggerTool.

Play Traction Heat Map Functionality

In at least one embodiment, artists may view an interactive world map overlaid with "heat zones" indicating where and to what degree listeners have been streaming that artist's music. Artists may interact with a Play Traction Heat Map GUI to change views and/or filter criteria to view mobile plays, website plays, or both combined. In at least one embodiment, the Play Traction Heat Map Functionality may also be operable to enable the artist to further hone this map to a specific album or track.

Artist/Band Tweet @ Functionality

In at least one embodiment, if an artist has provided their Twitter handle in their DeliRadio artist profile, then, when a DeliRadio listener is streaming an artist's recording on the DeliRadio Mobile Application, with 1-click the user may send a Twitter message ("tweet") directly at the artist's Twitter handle, with an automatically generated (or personalized) comment and a link to the artist's DeliRadio station. Any Twitter user who "follows" the DeliRadio user sending the tweet, who follows the artist on Twitter or who follows DeliRadio on Twitter may see the tweet in their "feed." Any Twitter user who clicks on the link for the artist's station may view the artist's upcoming concert dates. In one embodiment, the first date displayed may be presented per the algorithm described in the "Display of Relevant Gigs on a Per User Geo-Location Basis" section.

Auto-Magic Blog Functionality

In at least one embodiment, any DeliRadio City/Neighborhood/Venue "Shows Near" or "Bands From" station may include a more comprehensive display of related content via that station's own unique, automatically updating website (or GUI or webpage). The station's own unique, automated content updating website may be referred to as the "AutoMagic Blog." In one embodiment of the AutoMagic Blog , the DeliRadio user responsible for owning or managing the station/blog would receive their own unique Twitter handle for that station/blog (e.g. @drfm_oakland). Information and/or other content which may be displayed at the AutoMagic Blog may include, but are not limited to, one or more of the following (or combinations thereof):

A map showing the specified radius for the station;

The station's venue and/or artist search results overlaid on that map, with associated playable links;

The station's search results of artists and concerts presented in list form;

Artist profiles of at least one artist in the search results;

A DeliRadio embedded player which plays the search results for that station;

A customized "outgoing" twitter feed of one or more tweets from the blog's owner;

A customized "incoming" twitter feed representing a real time search of one or more tweets by twitter users who include in their tweet a hashtag for the blog (e.g. #drfm_oakland). In at least one embodiment, the Blog's owner could "re-tweet" (e.g., from the owner's official Blog handle) any tweets containing the hashtag, thus creating a method for Twitter users to tweet comments and a method for the Blog owner to officially recognize those comments by retweeting them;

A "PLAY" button for the outgoing Twitter feed that uses technology to "scrape" any DeliRadio station links, allowing at least one tweet to be played as a DeliRadio Station, or one or more tweets in the feed to be played as a separate station;

A "PLAY" button for the incoming Twitter feed that uses technology to scrape any DeliRadio station links, allowing at least one tweet to be played as a DeliRadio Station, or one or more tweets in the feed to be played as a separate station;

Editorial content related to the artists and venues currently displayed, either linked in from outside websites or created within the Blog itself by the Blog owner;

Etc.

Track-Level Control Slider Functionality

In at least one embodiment, when an artist uploads audio recordings to DeliRadio, the "Track-Level Control Slider" gives them fine-grain control over how their recordings are made available and promoted across the internet, based on a "promotional sliding scale" that increases by degree of public availability. In at least one embodiment, the Track-Level Control Slider GUI may be configured or designed to enable a user to assign one or more separately definable access and/or usage attributes to each of the Artist's recordings (e.g., which have been uploaded to the DeliRadio System). Examples of such access and/or usage control attributes may include, but are not limited to, one or more of the following (or combinations thereof):

For Sale Only: Tracks marked as "for sale only" are not streamable anywhere on DeliRadio, but downloads may be purchased on the artist's DeliRadio profile page by listeners.

Profile Only: Tracks marked as "profile only" are streamable only on the artist's DeliRadio profile page via the Pop-Out Player (which may also be embedded elsewhere on the internet), but these tracks may not be included in the pool of tracks available for stations created by DeliRadio users and stations automatically generated by DeliRadio.

Radio Enabled: Tracks marked as "radio enabled" may be streamable on the artist's DeliRadio profile page via the Pop-Out Player, and may also be included in the pool of tracks available for stations created by DeliRadio users and automatically generated by DeliRadio.

Radio Preferred: Same as Radio Enabled, but "Radio Preferred" tracks may be played first when this artist appears in a DeliRadio station.

Free Download: This checkbox may be applied to any track, and may allow the free, promotional download of the marked track. Free downloads are only available on the artist's DeliRadio profile page.

Functionality for Targeted Promotion of Stations on the DeliRadio Website, Based on User Location In at least one embodiment, the DeliRadio homepage may be comprised in part of a "mosaic" of image "tiles", wherein each tile may depict a DeliRadio station selected for promotion on the homepage, including but not limited to one or more of the following (or combinations thereof): festival stations, venue stations, record label stations, artist stations, etc. These promotional mosaic tiles may be "tagged" in the DeliRadio System as being associated with a specific geographic region or regions. For example, a festival taking place in New York may be tagged as being associated with the eastern coast of the United States. When a user arrives at the DeliRadio homepage, the user may be geo-located based on their IP Address or user's mobile device, and the DeliRadio homepage promotional mosaic tiles may be automatically and dynamically selected (e.g., in real-time) based on that user's location, such that the promotional mosaic tiles the user sees on the homepage may be directly geo-targeted to each individual user. For example, the DeliRadio System may determine a first user's geolocation as being Paris, France, and in response, the DeliRadio System may display to the user only promotional mosaic tiles associated with the geographic region(s) in and around Paris. In contrast, the DeliRadio System may determine a second user's geolocation as being San Francisco, California, and may display to the second user only promotional mosaic tiles associated with the geographic region(s) in and around San Francisco, California.

Share a Gig Functionality

Compatible with the conventional ways to share content between users and among existing social networks (e.g., Facebook, Twitter, etc.), a DeliRadio user may select a particular show or event from an artist's upcoming tour calendar, and share that show/event via the DeliRadio mobile and web apps. This would mark a user's interest in that particular show, which may be visible to other users of the DeliRadio System, and may present an opportunity to other DeliRadio users to express their interest in the identified show/event.

Venue Check-In Functionality

In at least one embodiment, mobile device users may use the DeliRadio Mobile Application to "Check-In" at a show or event. For example, in one embodiment, by accessing one or more databases relating to events, shows, and/or tour dates (e.g., including, for example, DeliRadio tour date archive database), and using the geolocation services/functionality at the user's mobile device (at least a portion of which may be provided by the DeliRadio Mobile Application), the venue check-in process may be streamlined considerably as compared to more traditional methods of check-in. In at least one embodiment, the DeliRadio Mobile Application may be configured or designed to include functionality for facilitating user "Check-In" activities at a given venue & event. After completing a check-in activity at a given location, the user may be granted (e.g., via the DeliRadio Mobile Application and/or DeliRadio website) access to additional functionality, promotional opportunities, and/or rewards, such as, for example, one or more of the following (or combinations thereof):

Join the venue email list

Vote for upcoming shows (e.g., at that venue);

Access current band's info, twitter, Facebook, merchandise and email list signups;

Incentives for discounted drinks and/or merchandise;

receive information or notification about friends or other DeliRadio users who will be attending one or more show(s) at the venue and/or who have already check-in at the venue for the current show;

Send photos to band and/or DeliRadio Band/Artist webpage or blog;

Integrate with additional "check-in" services;

Earn points for social activity which may be later redeemed by the user for promotional rewards, incentives, etc.

Embedded Players and Extended Functionality

In at least one embodiment, the DeliRadio System technology disclosed herein provides capability for any DeliRadio Station, Album, or Artist to be embedded in any webpage on the World Wide Web, using an <iframe> tag and HTML5 code, for example. The user may customize the appearance of the embedded player prior to receiving the code. The user may customize: color scheme & width of the player, along with choosing the visibility of tour dates, photos, & station title. In one embodiment, when an embedded player is first loaded, it will cycle through the artists in the station in a random order, displaying one highlighted gig according to certain criteria. This first displayed tour date is chosen with regards to the 'closest upcoming show' in geographic proximity, based on the geolocation of the user (e.g., via user's IP address or via geolocation of users mobile device). If a DeliRadio Station has been created based on specific 'Venue Criteria', the highlighted date(s) will be the upcoming date(s) that occurs at one of the specified venue(s).

In some embodiments, the Embedded Players and Extended Functionality may include the ability for a venue to embed a complete concert calendar which may include listings for bands that aren't currently members of DeliRadio and/or which may include bands which are not currently in the DeliRadio database. Concert calendars may be accompanied by additional GUI features/buttons in the embedded window for enabling features such as, for example, one or more of the following (or combinations thereof): genre and date range selectors, multiple stages or associated venues, social sharing tools, etc.

In at least one embodiment, Track and Album embeds may be accompanied by corresponding track list(s), with additional GUI features/buttons in the embedded window for enabling features such as, for example, one or more of the following (or combinations thereof): downloading the tracks, social sharing tools, favoriting/liking/following controls, purchase options, links to external sites for purchase/download, etc.

In one embodiment, a user may choose to customize and embed a button (e.g., via a <script>tag) that creates a button on an external web page that immediately triggers a pop-up window containing just the DeliRadio player for that Station, Artist or Track. The Embedded Players and Extended Functionality may include is functionality for the embedded player to cycle through the photos of bands in the embedded station, even if the visitor to the website where the player is embedded has not tapped or clicked on the "PLAY" button. In at least one embodiment, this may result in the display of an automatically and/or dynamically generated "slideshow" of images of the artist(s) associated with that particular station.

EXAMPLES

The following examples are intended to help illustrate some of the various types of functions, operations, actions, and/or other features which may be provided by the MMMS System. By way of example, described below are some examples of "Stations" that may be created, named, saved, shared and listened to in real-time via the MMMS System, by adjusting the intuitive filters that appear in the various GUIs presented by the MMMS System.

(1) A DeliRadio Station comprised of songs by indie rock bands (or any other genre) that are playing shows within 10 miles San Francisco this Saturday night.
  While the collection of songs is being streamed to the user's computer or mobile device, a photo slide-show of the current Artist is simultaneously streamed and rotated on the listeners browser or mobile device.
  Date and location of upcoming show nearby is displayed next to current Artist and track information.
  In many urban areas, fans have the opportunity to see dozens of shows on any given night.
  By creating this station, they may be able to hear a selection of songs relating only to those Artists who have been identified as playing upcoming shows within 10 miles San Francisco within the specified time period.
  Stations may be shared with friends on Facebook, twitter or any other social media sites, instantly.

(2) A DeliRadio Station comprised of bands from a high school, college, hometown, or any other geographical grouping.
  In at least one embodiment, the MMMS System may include functionality for enabling the user to post a link to a selected DeliRadio Station on Facebook or social networks. From there, one or more the user's friends may view the post/link, and may instantly listen to the DeliRadio Station by clicking on the link (for example). In at least one embodiment, the user's social networking friends and/or other DeliRadio users may be able to chat with the user (or with others) via a chat GUI which may be incorporated into the associated DeliRadio Station web page. According to different embodiments, DeliRadio Station chat functionality may be selectively enabled and/or disabled by the creator/owner of that DeliRadio Station.

(3) A DeliRadio Station comprised of choir music from choirs based in and around Oakland, Calif.
  Very many choir groups exist nationwide, and most of them make recordings which are difficult to promote and share publically.
  A DeliRadio 'Oakland Choir Radio' Station may be dynamically created by the MMMS System and could be made to be publically accessible a variety of different groups such as, for example, one or more of the following (or combinations thereof): users/members of the MMMS System; social network friends and family; anyone who is able to obtain the URL to the DeliRadio Oakland Choir Radio Station (e.g., by doing a Google search, for example).

(4) A DeliRadio Station comprised of California high school bands that rank in the top 100 "most popular", "most listened to", etc.
  Rankings may be generated and/or updated manually, automatically, and/or programmatically via data gathered from statistics and analytics relating to artist and user actions, such as 'track play count', 'page views', 'MMMS player spins', most starred, 'band preferred', upcoming tour dates, etc.

(5) A DeliRadio Station of US serviceman rock bands (stationed anywhere in the world.)
  Could be active members only, or active and retired.
  Could be genre agnostic; for instance, it could be rap-specific, reggae, etc.
  Example DeliRadio Station: One or more 'Southern Rock' groups, currently stationed in Iraq.

(6) A DeliRadio Station comprised of bands made up of workers at Safeway supermarkets
  Once a DeliRadio Safeway Station was created, bands that want to be included in this station may send requests to the station owner asking to be added.
  Stations may be earmarked as "closed" or "open" to non-owner manipulation of content.
  Corporations could find this a healthy morale building enterprise, and could even promote it actively as such.

(7) A DeliRadio Station comprised of bands playing upcoming shows at a SPECIFIC VENUE.
  A lot of music fans have a favorite venue(s).
  The songs and artists associated with the Station may be automatically, dynamically and/or periodically updated so that it may be kept current with the upcoming events, shows, artists, song popularity, etc.
  Venues could post links to their DeliRadio Station on their web sites, and send links to their DeliRadio Station out to recipients on the venue mailing list.

In at least one embodiment, the content streamed by the DeliRadio Venue Station may automatically and periodically be updated (e.g., "Always Be Current"). In one embodiment, the Station owner (e.g., which may be the venue's agent) may manually update DeliRadio's database of upcoming shows and events that particular venue. In other embodiments, the MMMS System may automatically and periodically access updated venue-specific event/date/artist information from one or more remote databases and APIs such as, for example, those provided by, Songkick, Last FM, etc.

One significant advantage/benefit of the customized DeliRadio Venue Station is that it facilitates and provides the ability for end users and customers to easily access, learn about, explore, and listen to music from bands/artists who will be performing (and/or who have performed) at a given venue. Venues may advantageously leverage the features and advantages by embedding their customized, venue-specific DeliRadio Station in the home page (or other web pages) of the venue's website.

Another significant advantage/benefit customized DeliRadio Venue Station is that it allows the venue to offload the tasks of managing, uploading, and updating the venue's website with new music relating to the artists of upcoming shows. For example, in one embodiment, when the venue books an upcoming show with a given artist, the venue may simply instruct the artist to upload one or more of the artist's song(s) and/or album(s) to the DeliRadio System. In at least one embodiment, the DeliRadio System may include functionality for automatically monitoring newly uploaded content, and cross checking the identified content with other resources in order to automatically link selected portions of the newly uploaded content with selected DeliRadio Stations.

In at least one embodiment, the MMMS System may be configured or designed to automatically identify various types of criteria (e.g., song, artist, album, video, venue, user location, artist location, etc.) relating to content being displayed to a user as the user accesses the DeliRadio website and/or DeliRadio Mobile Application.

In at least one embodiment, one or more GUIs may be displayed to the user to facilitate operation and/or initiation of the various features and functions disclosed herein. According to different embodiments, the GUIs may be implemented via use of a web browser application, a mobile device application, a desktop application, a cloud-based service, etc. In at least one embodiment, a User Web Interface may provide functionality for dynamically generating at least a portion of the GUIs.

As illustrated in the example embodiment of FIG. 2, the MMMS System may include one or more databases (e.g. 240, FIG. 2), which, for example, may be populated with information and/or content relating to music, videos, venues, events, merchants, merchandise, artists, user profile information, user activity information, radio station information, etc.

In at least one embodiment, one or more of the databases may be queried via the use of various types of programming languages and/or protocols such as, for example, one or more of the following (or combinations thereof): HTML, XML, MySQL, Perl, Ajax, JavaScript, Etc.

In at least one embodiment, a user may initiate a MMMS session via the Internet (e.g., via 240, FIG. 2) to cause the MMMS System to perform and/or initiate various functions and operations (such as those described and/or referenced herein), according to user-specified criteria.

In at least one embodiment, the MMMS System may be operable to populate and/or access information at Database(s) 214, and utilize such information in order to identify and/or determine artist information and/or music content according to user-specified criteria. Examples of such database information may include, but are not limited to, one or more of the following (or combinations thereof):
  artist profile criteria, including, but not limited to artist rating, artist feedback, etc.;
  artist location information;
  music genre information;
  venue information;
  artist event performance information and related venue information;
  ticketing information;
  geographical information relating to artists, events, venues, users, etc.
  calendar information relating to artist performances, venue events, etc.
  negative filter criteria;
  music streaming services;
  Artist criteria;
  Similarity to other artists
  Brand-related criteria such as, for example, branding information related to (or associated with) one or more of the following (or combinations thereof): Song; Artist; Team; Celebrity; Album; Venue; Trademarks; Corporate Identities; Content owners; Publisher; Author; Distributor; Digital Content Criteria; Etc.

Various embodiments disclosed herein may be configured, designed, or otherwise operable to initiate, perform and/or provide different types of advantages, benefits and/or other features such as, for example, one or more advantages and/or benefits described and/or referenced herein.

For example, in at least one embodiment, the MMMS System functionality may be operable to perform and/or implement various types of functions, operations, actions, and/or other features such as, for example, one or more of the following (or combinations thereof):
  Monitor user behaviors and activities;
  Identify brand-related information associated with user-accessible content that the user is accessing; has requested access to; and/or has interest in;
  Identify songs and/or artists based on specified criteria;
  Manage and track revenue sharing;
  Manage reporting;
  Transact online ordering and purchasing;
  Transact Database queries/responses
  Acquire and manage artist-related music content and other artist-related information;
  Manage artist subscription services;
  Create user customized music streaming stations, e.g., based on user-specified filter criteria;
  Acquire and manage artist performance event and related venue information;
  Provide query disambiguation;
  Provide input correction/suggestion functionality such as, for example, normalization of brand name, brand identity and/or other searchable criteria amongst misspelled and/or other spelling variations;
  Facilitate artist profile management and user subscriptions;
  Manage and track songs and/or other media content which has been streamed to user(s);
  Etc.

According to specific embodiments, multiple instances or threads of the MMMS System functionality may be concurrently implemented and/or initiated via the use of one or more processors and/or other combinations of hardware and/or hardware and software. For example, in at least some embodiments, various aspects, features, and/or functionalities of the MMMS System mechanism(s) may be performed, implemented and/or initiated by one or more of the various systems, components, systems, devices, procedures, and/or processes described herein.

According to different embodiments, one or more different threads or instances of the MMMS System functionality may be initiated in response to detection of one or more conditions or events satisfying one or more different types of minimum threshold criteria for triggering initiation of at least one instance of the MMMS System functionality. Various examples of conditions or events which may trigger initiation and/or implementation of one or more different threads or instances of the MMMS System functionality may include, but are not limited to, one or more of the following (or combinations thereof):

- Detection of user interest in particular artist, brand, genre, geographic location and/or other criteria
- Identification of user;
- Identification of music content matching specified criteria;
- Detection of user input;
- Identification of artist performance event(s) matching specified criteria;
- Detection of artist input;
- Identification of artist performance event(s);
- Identification of user's geographic location;
- Determination of revenue sharing distributions;
- Receiving database query communication from external server;
- Etc.

In at least one embodiment, a given instance of the MMMS System functionality may access and/or utilize information from one or more associated databases. In at least one embodiment, at least a portion of the database information may be accessed via communication with one or more local and/or remote memory devices. Examples of different types of data which may be accessed by the MMMS System functionality may include, but are not limited to, one or more of the following (or combinations thereof):

- Brand-related information;
- User behavior and analytic information;
- Performance information;
- Artist information;
- Venue Information;
- Artist performance event information;
- Geographic location information (e.g., relating to artist performances, events, user location, artist origination, venues, etc.)
- Brand related taxonomy information;
- Artist subscription information;
- Ecommerce related transaction information;
- Publisher/Content Provider information;
- User profile information;
- Artist profile information;
- Music inventory information;
- Artist-brand association information;
- etc.
- It may be appreciated that the various embodiments of the MMMS Systems disclosed herein are but a few examples from a wide range of MMMS System embodiments which may be implemented. Other embodiments of the MMMS System (not shown) may include additional, fewer and/or different components/features that those illustrated and described herein.

Figure 3:
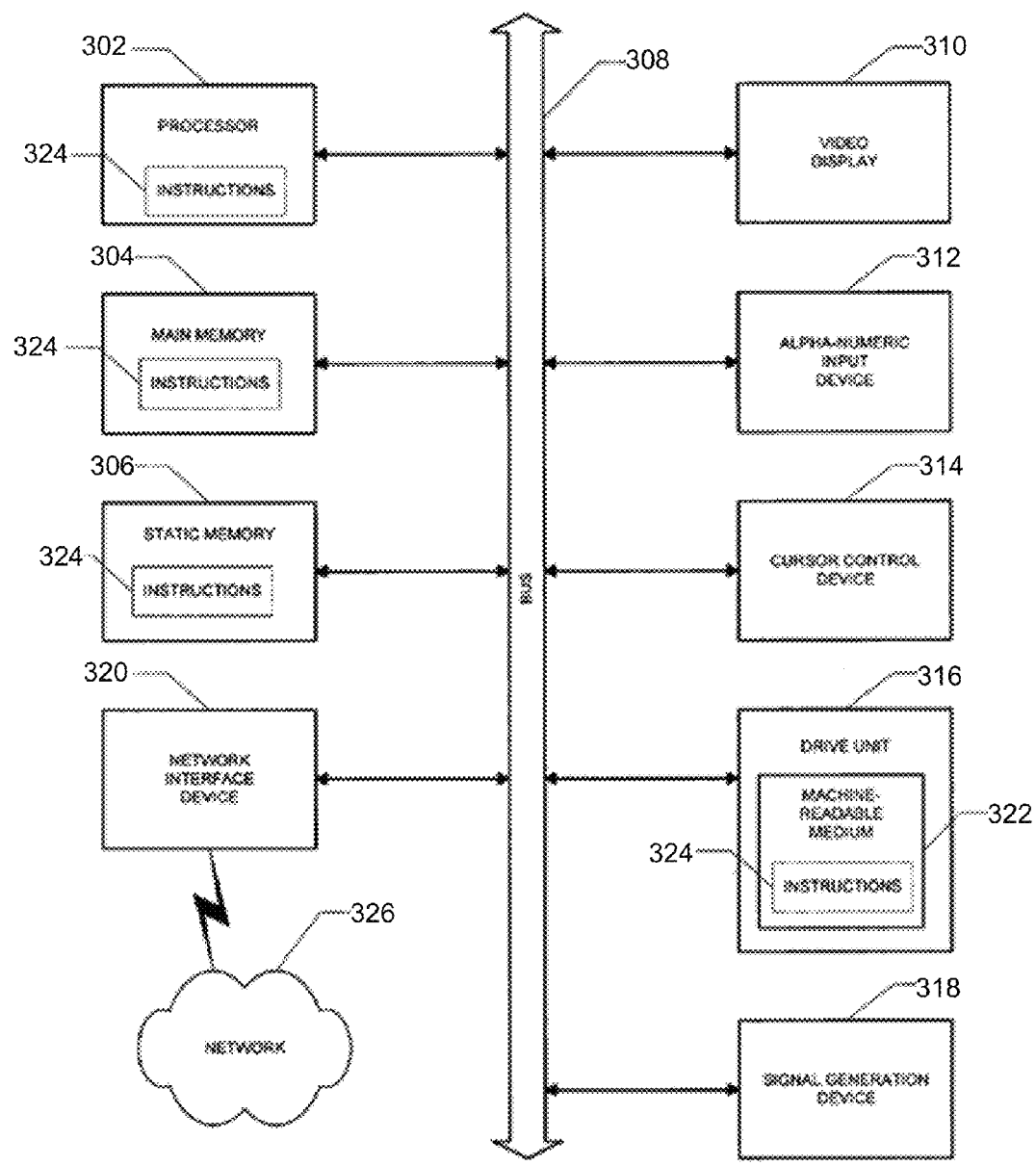
FIG. 3 shows a diagrammatic representation of machine in the exemplary form of a client (or end user) computer system 300.

FIG. 3 shows a diagrammatic representation of machine in the exemplary form of a client (or end user) computer system 300 within which a set of instructions, for causing the machine to perform any one or more of the methodologies discussed herein, may be executed. In alternative embodiments, the machine operates as a standalone device or may be connected (e.g., networked) to other machines. In a networked deployment, the machine may operate in the capacity of a server or a client machine in server-client network environment, or as a peer machine in a peer-to-peer (or distributed) network environment. The machine may be a personal computer (PC), a tablet PC, a set-top box (STB), a Personal Digital Assistant (PDA), a cellular telephone, a web appliance, a network router, switch or bridge, or any machine capable of executing a set of instructions (sequential or otherwise) that specify actions to be taken by that machine. Further, while only a single machine is illustrated, the term "machine" may also be taken to include any collection of machines that individually or jointly execute a set (or multiple sets) of instructions to perform any one or more of the methodologies discussed herein.

The exemplary computer system 300 includes a processor 302 (e.g., a central processing unit (CPU), a graphics processing unit (GPU) or both), a main memory 304 and a static memory 306, which communicate with at least one other via a bus 308. The computer system 300 may further include a video display unit 310 (e.g., a liquid crystal display (LCD) or a cathode ray tube (CRT)). The computer system 300 also includes an alphanumeric input device 312 (e.g., a keyboard), a user interface (UI) navigation device 314 (e.g., a mouse), a disk drive unit 316, a signal generation device 318 (e.g., a speaker) and a network interface device 320.

The disk drive unit 316 includes a machine-readable medium 322 on which is stored one or more sets of instructions and data structures (e.g., software 324) embodying or utilized by any one or more of the methodologies or functions described herein. The software 324 may also reside, completely or at least partially, within the main memory 304 and/or within the processor 302 during execution thereof by the computer system 300, the main memory 304 and the processor 302 also constituting machine-readable media.

The software 324 may further be transmitted or received over a network 326 via the network interface device 320 utilizing any one of a number of well-known transfer protocols (e.g., HTTP).

While the machine-readable medium 322 is shown in an exemplary embodiment to be a single medium, the term "machine-readable medium" may be taken to include a single medium or multiple media (e.g., a centralized or distributed database, and/or associated caches and servers) that store the one or more sets of instructions. The term "machine-readable medium" may also be taken to include any medium that is capable of storing, encoding or carrying a set of instructions for execution by the machine and that cause the machine to perform any one or more of the methodologies of the present invention, or that is capable of storing, encoding or carrying data structures utilized by or associated with such a set of instructions. The term "machine-readable medium" may accordingly be taken to include, but not be limited to, solid-state memories, optical and magnetic media, and carrier wave signals. Although an embodiment of the present invention has been described with reference to specific exemplary embodiments, it may be evident that various modifications and changes may be made to these embodiments without departing from the broader spirit and scope of the invention. Accordingly, the specification and drawings are to be regarded in an illustrative rather than a restrictive sense.

According to various embodiments, Client Computer System 300 may include a variety of components, modules and/or systems for providing various types of functionality. For example, in at least one embodiment, Client Computer System 300 may include a web browser application which is operable to process, execute, and/or support the use of scripts (e.g., JavaScript, AJAX, etc.), Plug-ins, executable code, virtual machines, vector-based web animation (e.g., Adobe Flash), etc.

In at least one embodiment, the web browser application may be configured or designed to instantiate components and/or objects at the Client Computer System in response to processing scripts, instructions, and/or other information received from a remote server such as a web server. Examples of such components and/or objects may include, but are not limited to, one or more of the following (or combinations thereof):

- User Interface (UI) Components such as those illustrated, described, and/or referenced herein.
- Database Components such as those illustrated, described, and/or referenced herein.
- Processing Components such as those illustrated, described, and/or referenced herein.
- Other Components which, for example, may include components for facilitating and/or enabling the Client Computer System to perform and/or initiate various types of operations, activities, functions such as those described herein.

Figure 4:
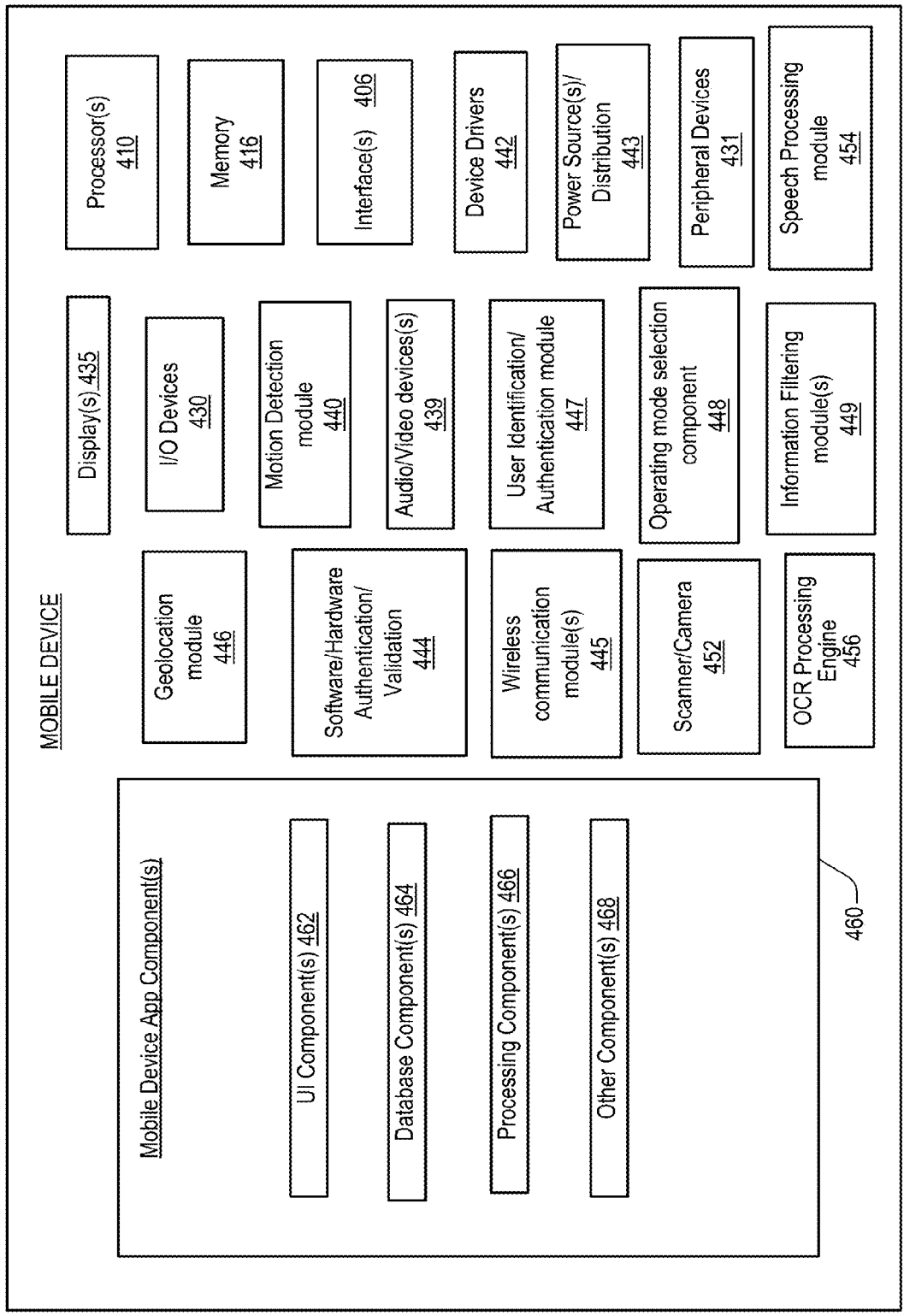
FIG. 4 is a simplified block diagram of an exemplary client system 400 in accordance with a specific embodiment.

FIG. 4 is a simplified block diagram of an exemplary client system 400 in accordance with a specific embodiment. In at least one embodiment, the client system may include MMMS Mobile Device App Component(s) which have been configured or designed to provide functionality for enabling or implementing at least a portion of the various MMMS techniques at the client system.

According to specific embodiments, various aspects, features, and/or functionalities of the Mobile Device may be performed, implemented and/or initiated by one or more of the following types of systems, components, systems, devices, procedures, processes, etc. (or combinations thereof):

- Processor(s) 410
- Device Drivers 442
- Memory 416
- Interface(s) 406
- Power Source(s)/Distribution 443
- Geolocation module 446
- Display(s) 435
- I/O Devices 430
- Audio/Video devices(s) 439
- Peripheral Devices 431
- Motion Detection module 440
- User Identification/Authentication module 447
- Client App Component(s) 460
- Other Component(s) 468
- UI Component(s) 462
- Database Component(s) 464
- Processing Component(s) 466
- Software/Hardware Authentication/Validation 444
- Wireless communication module(s) 445
- Information Filtering module(s) 449
- Operating mode selection component 448
- Speech Processing module 454
- Scanner/Camera 452
- OCR Processing Engine 456
- etc.

As illustrated in the example of FIG. 4 Mobile Device 400 may include a variety of components, modules and/or systems for providing various functionality. For example, as illustrated in FIG. 4, Mobile Device 400 may include Mobile Device Application components (e.g., 460), which, for example, may include, but are not limited to, one or more of the following (or combinations thereof):

- UI Components 462 such as those illustrated, described, and/or referenced herein.
- Database Components 464 such as those illustrated, described, and/or referenced herein.
- Processing Components 466 such as those illustrated, described, and/or referenced herein.
- Other Components 468 which, for example, may include components for facilitating and/or enabling the Mobile Device to perform and/or initiate various types of operations, activities, functions such as those described herein.

In at least one embodiment, the Mobile Device Application component(s) may be operable to perform and/or implement various types of functions, operations, actions, and/or other features such as, for example, one or more of those described or referenced herein.

According to specific embodiments, multiple instances or threads of the Mobile Device Application component(s) may be concurrently implemented and/or initiated via the use of one or more processors and/or other combinations of hardware and/or hardware and software. For example, in at least some embodiments, various aspects, features, and/or functionalities of the Mobile Device Application component(s) may be performed, implemented and/or initiated by one or more systems, components, systems, devices, procedures, processes, such as, for example, one or more of those described or referenced herein.

According to different embodiments, one or more different threads or instances of the Mobile Device Application component(s) may be initiated in response to detection of one or more conditions or events satisfying one or more different types of minimum threshold criteria for triggering initiation of at least one instance of the Mobile Device Application component(s). Various examples of conditions or events which may trigger initiation and/or implementation of one or more different threads or instances of the Mobile Device Application component(s) may include, but are not limited to, one or more of those described or referenced herein.

In at least one embodiment, a given instance of the Mobile Device Application component(s) may access and/or utilize information from one or more associated databases. In at least one embodiment, at least a portion of the database information may be accessed via communication with one or more local and/or remote memory devices. Examples of different types of data which may be accessed by the Mobile Device Application component(s) may include, but are not limited to, one or more of those described or referenced herein.

According to different embodiments, Mobile Device 400 may further include, but is not limited to, one or more of the following types of components, modules and/or systems (or combinations thereof):

- At least one processor 410. In at least one embodiment, the processor(s) 410 may include one or more commonly known CPUs which are deployed in many of today's consumer electronic devices, such as, for example, CPUs or processors from the Motorola or Intel family of microprocessors, etc. In an alternative embodiment, at least one processor may be specially designed hardware for controlling the operations of the client system. In a specific embodiment, a memory (such as non-volatile RAM and/or ROM) also forms part of CPU. When acting under the control of appropriate software or firmware, the CPU may be responsible for implementing specific functions associated with the functions of a desired network device. The CPU preferably accomplishes one or more these functions under the control of software including an operating system, and any appropriate applications software.

Memory 416, which, for example, may include volatile memory (e.g., RAM), non-volatile memory (e.g., disk memory, FLASH memory, EPROMs, etc.), unalterable memory, and/or other types of memory. In at least one implementation, the memory 416 may include functionality similar to at least a portion of functionality implemented by one or more commonly known memory devices such as those described herein and/or generally known to one having ordinary skill in the art. According to different embodiments, one or more memories or memory modules (e.g., memory blocks) may be configured or designed to store data, program instructions for the functional operations of the client system and/or other information relating to the functionality of the various MMMS techniques described herein. The program instructions may control the operation of an operating system and/or one or more applications, for example. The memory or memories may also be configured to store data structures, metadata, timecode synchronization information, audio/visual media content, asset file information, keyword taxonomy information, advertisement information, and/or information/data relating to other features/functions described herein. Because such information and program instructions may be employed to implement at least a portion of the MMMS techniques described herein, various aspects described herein may be implemented using machine readable media that include program instructions, state information, etc. Examples of machine-readable media include, but are not limited to, magnetic media such as hard disks, floppy disks, and magnetic tape; optical media such as CD-ROM disks; magneto-optical media such as floptical disks; and hardware devices that are specially configured to store and perform program instructions, such as read-only memory devices (ROM) and random access memory (RAM). Examples of program instructions include both machine code, such as produced by a compiler, and files containing higher level code that may be executed by the computer using an interpreter.

Interface(s) 406 which, for example, may include wired interfaces and/or wireless interfaces. In at least one implementation, the interface(s) 406 may include functionality similar to at least a portion of functionality implemented by one or more computer system interfaces such as those described herein and/or generally known to one having ordinary skill in the art. For example, in at least one implementation, the wireless communication interface(s) may be configured or designed to communicate with selected electronic game tables, computer systems, remote servers, other wireless devices (e.g., PDAs, cell phones, player tracking transponders, etc.), etc. Such wireless communication may be implemented using one or more wireless interfaces/protocols such as, for example, 802.11 (WiFi), 802.15 (including Bluetooth™), 802.16 (WiMax), 802.22, Cellular standards such as CDMA, CDMA2000, WCDMA, Radio Frequency (e.g., RFID), Infrared, Near Field Magnetics, etc.

Device driver(s) 442. In at least one implementation, the device driver(s) 442 may include functionality similar to at least a portion of functionality implemented by one or more computer system driver devices such as those described herein and/or generally known to one having ordinary skill in the art.

At least one power source (and/or power distribution source) 443. In at least one implementation, the power source may include at least one mobile power source (e.g., battery) for allowing the client system to operate in a wireless and/or mobile environment. For example, in one implementation, the power source 443 may be implemented using a rechargeable, thin-film type battery. Further, in embodiments where it is desirable for the device to be flexible, the power source 443 may be designed to be flexible.

Geolocation module 446 which, for example, may be configured or designed to acquire geolocation information from remote sources and use the acquired geolocation information to determine information relating to a relative and/or absolute position of the client system.

Motion detection component 440 for detecting motion or movement of the client system and/or for detecting motion, movement, gestures and/or other input data from user. In at least one embodiment, the motion detection component 440 may include one or more motion detection sensors such as, for example, MEMS (Micro Electro Mechanical System) accelerometers, that may detect the acceleration and/or other movements of the client system as it is moved by a user.

User Identification/Authentication module 447. In one implementation, the User Identification module may be adapted to determine and/or authenticate the identity of the current user or owner of the client system. For example, in one embodiment, the current user may be required to perform a log in process at the client system in order to access one or more features. Alternatively, the client system may be adapted to automatically determine the identity of the current user based upon one or more external signals such as, for example, an RFID tag or badge worn by the current user which provides a wireless signal to the client system for determining the identity of the current user. In at least one implementation, various security features may be incorporated into the client system to prevent unauthorized users from accessing confidential or sensitive information.

One or more display(s) 435. According to various embodiments, such display(s) may be implemented using, for example, LCD display technology, OLED display technology, and/or other types of conventional display technology. In at least one implementation, display(s) 435 may be adapted to be flexible or bendable. Additionally, in at least one embodiment the information displayed on display(s) 435 may utilize e-ink technology (such as that available from E Ink Corporation, Cambridge, Mass., www.eink.com), or other suitable technology for reducing the power consumption of information displayed on the display(s) 435.

One or more user I/O Device(s) 430 such as, for example, keys, buttons, scroll wheels, cursors, touchscreen sensors, audio command interfaces, magnetic strip reader, optical scanner, etc.

Audio/Video device(s) 439 such as, for example, components for displaying audio/visual media which, for example, may include cameras, speakers, microphones, media presentation components, wireless transmitter/receiver devices for enabling wireless audio and/or visual communication between the client system 400 and remote devices (e.g., radios, telephones, computer systems, etc.). For example, in one implementation, the audio system may include componentry for enabling the client system to function as a cell phone or two-way radio device.

Other types of peripheral devices 431 which may be useful to the users of various client systems, such as, for example: PDA functionality; memory card reader(s); fingerprint reader(s); image projection device(s); social networking peripheral component(s); etc.

Information filtering module(s) 449 which, for example, may be adapted to automatically and dynamically generate, using one or more filter parameters, filtered information to be displayed on one or more displays of the mobile device. In one implementation, such filter parameters may be customizable by the player or user of the device. In some embodiments, information filtering module(s) 449 may also be adapted to display, in real-time, filtered information to the user based upon a variety of criteria such as, for example, geolocation information, casino data information, player tracking information, etc.

Wireless communication module(s) 445. In one implementation, the wireless communication module 445 may be configured or designed to communicate with external devices using one or more wireless interfaces/protocols such as, for example, 802.11 (WiFi), 802.15 (including Bluetooth™), 802.16 (WiMax), 802.22, Cellular standards such as CDMA, CDMA2000,WCDMA, Radio Frequency (e.g., RFID), Infrared, Near Field Magnetics, etc.

Software/Hardware Authentication/validation components 444 which, for example, may be used for authenticating and/or validating local hardware and/or software components, hardware/software components residing at a remote device, game play information, wager information, user information and/or identity, etc. Examples of various authentication and/or validation components are described in U.S. Pat. No. 6,620,047, titled, "ELECTRONIC GAMING APPARATUS HAVING AUTHENTICATION DATA SETS," incorporated herein by reference in its entirety for one or more purposes.

Operating mode selection component 448 which, for example, may be operable to automatically select an appropriate mode of operation based on various parameters and/or upon detection of specific events or conditions such as, for example: the mobile device's current location; identity of current user; user input; system override (e.g., emergency condition detected); proximity to other devices belonging to same group or association; proximity to specific objects, regions, zones, etc. Additionally, the mobile device may be operable to automatically update or switch its current operating mode to the selected mode of operation. The mobile device may also be adapted to automatically modify accessibility of user-accessible features and/or information in response to the updating of its current mode of operation.

Scanner/Camera Component(s) (e.g., 452) which may be configured or designed for use in scanning identifiers and/or other content from other devices and/or objects such as for example: mobile device displays, computer displays, static displays (e.g., printed on tangible mediums), etc.

OCR Processing Engine (e.g., 456) which, for example, may be operable to perform image processing and optical character recognition of images such as those captured by a mobile device camera, for example.

Speech Processing module (e.g., 454) which, for example, may be operable to perform speech recognition, and may be operable to perform speech-to-text conversion.

Etc.

Figure 5:
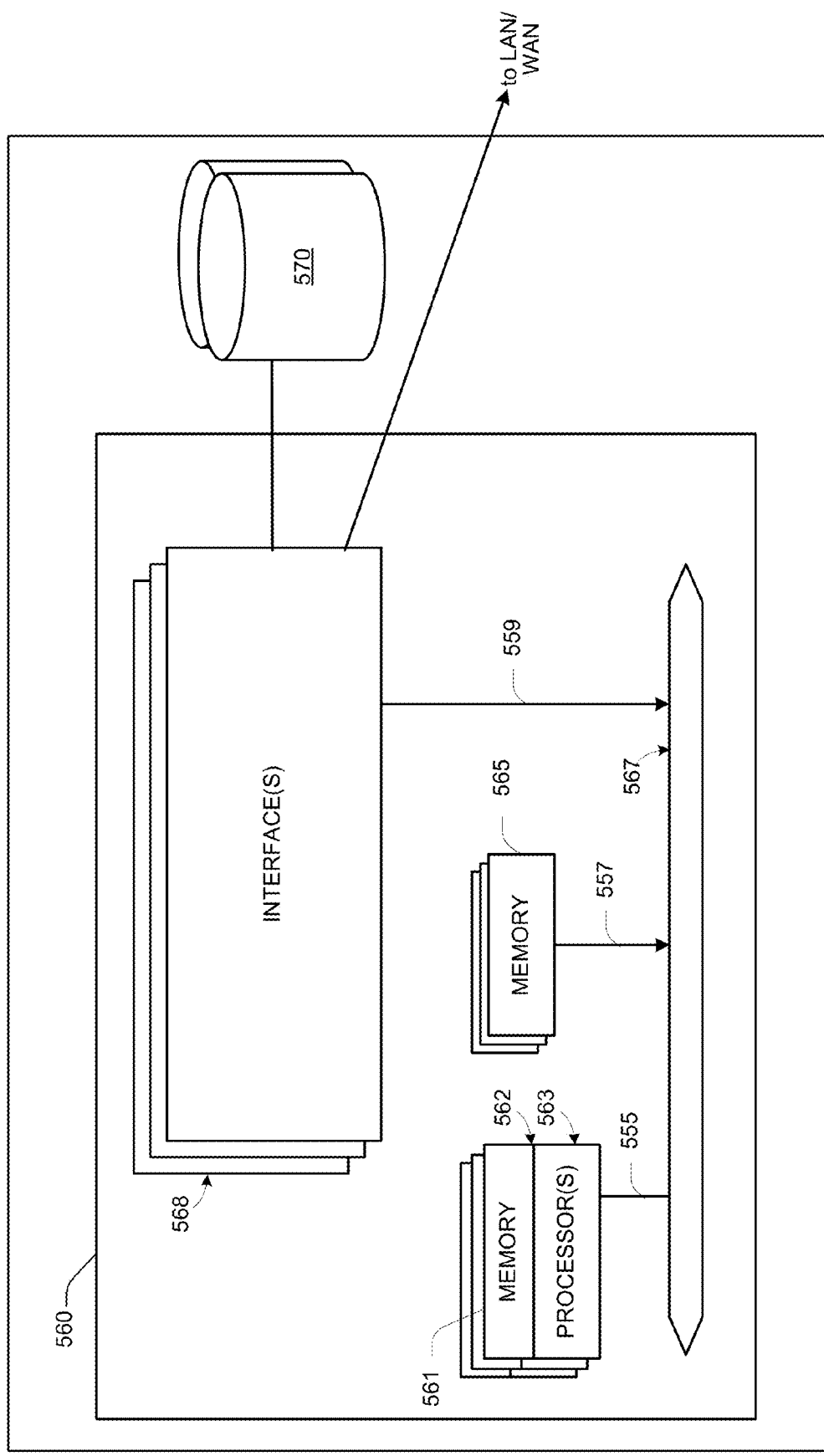
FIG. 5 illustrates an example embodiment of a server system 580 which may be used for implementing various aspects/features described herein.

FIG. 5 illustrates an example embodiment of a server system 580 which may be used for implementing various aspects/features described herein. In at least one embodiment, the server system 580 includes at least one network device 560, and at least one storage device 570 (such as, for example, a direct attached storage device). In one embodiment, server system 580 may be suitable for implementing at least some of the MMMS techniques described herein.

In according to one embodiment, network device 560 may include a master central processing unit (CPU) 562, interfaces 568, and a bus 567 (e.g., a PCI bus). When acting under the control of appropriate software or firmware, the CPU 562 may be responsible for implementing specific functions associated with the functions of a desired network device. For example, when configured as a server, the CPU 562 may be responsible for analyzing packets; encapsulating packets; forwarding packets to appropriate network devices; instantiating various types of virtual machines, virtual interfaces, virtual storage volumes, virtual appliances; etc. The CPU 562 preferably accomplishes at least a portion of these functions under the control of software including an operating system (e.g. Linux), and any appropriate system software (such as, for example, AppLogic(™)(TM) software).

CPU 562 may include one or more processors 563 such as, for example, one or more processors from the AMD, Motorola, Intel and/or MIPS families of microprocessors. In an alternative embodiment, processor 563 may be specially designed hardware for controlling the operations of server system 580. In a specific embodiment, a memory 561 (such as non-volatile RAM and/or ROM) also forms part of CPU 562. However, there may be many different ways in which memory could be coupled to the system. Memory block 561 may be used for a variety of purposes such as, for example, caching and/or storing data, programming instructions, etc.

The interfaces 568 may be typically provided as interface cards (sometimes referred to as "line cards"). Alternatively, one or more of the interfaces 568 may be provided as on-board interface controllers built into the system motherboard. Generally, they control the sending and receiving of data packets over the network and sometimes support other peripherals used with the server system 580. Among the interfaces that may be provided may be FC interfaces, Ethernet interfaces, frame relay interfaces, cable interfaces, DSL interfaces, token ring interfaces, Infiniband interfaces, and the like. In addition, various very high-speed interfaces may be provided, such as fast Ethernet interfaces, Gigabit Ethernet interfaces, ATM interfaces, HSSI interfaces, POS interfaces, FDDI interfaces, ASI interfaces, DHEI interfaces and the like. Other interfaces may include one or more wireless interfaces such as, for example, 802.11 (WiFi) interfaces, 802.15 interfaces (including Bluetooth™), 802.16 (WiMax) interfaces, 802.22 interfaces, Cellular standards such as CDMA interfaces, CDMA2000 interfaces, WCDMA interfaces, TDMA interfaces, Cellular 3G interfaces, etc.

Generally, one or more interfaces may include ports appropriate for communication with the appropriate media. In some cases, they may also include an independent processor and, in some instances, volatile RAM. The independent processors may control such communications intensive tasks as packet switching, media control and management. By providing separate processors for the communications intensive tasks, these interfaces allow the master microprocessor 562 to efficiently perform routing computations, network diagnostics, security functions, etc.

In at least one embodiment, some interfaces may be configured or designed to allow the server system 580 to communicate with other network devices associated with various local area network (LANs) and/or wide area networks (WANs). Other interfaces may be configured or designed to allow network device 560 to communicate with one or more direct attached storage device(s) 570.

Although the system shown in FIG. 5 illustrates one specific network device described herein, it is by no means the only network device architecture on which one or more embodiments may be implemented. For example, an architecture having a single processor that handles communications as well as routing computations, etc. may be used. Further, other types of interfaces and media could also be used with the network device.

Regardless of network device's configuration, it may employ one or more memories or memory modules (such as, for example, memory block 565, which, for example, may include random access memory (RAM)) configured to store data, program instructions for the general-purpose network operations and/or other information relating to the functionality of the various MMMS techniques described herein. The program instructions may control the operation of an operating system and/or one or more applications, for example. The memory or memories may also be configured to store data structures, and/or other specific non-program information described herein.

Because such information and program instructions may be employed to implement the systems/methods described herein, one or more embodiments relates to machine readable media that include program instructions, state information, etc. for performing various operations described herein. Examples of machine-readable storage media include, but are not limited to, magnetic media such as hard disks, floppy disks, and magnetic tape; optical media such as CD-ROM disks; magneto-optical media such as floptical disks; and hardware devices that may be specially configured to store and perform program instructions, such as read-only memory devices (ROM) and random access memory (RAM). Some embodiments may also be embodied in transmission media such as, for example, a carrier wave travelling over an appropriate medium such as airwaves, optical lines, electric lines, etc. Examples of program instructions include both machine code, such as produced by a compiler, and files containing higher level code that may be executed by the computer using an interpreter.

FIG. 6 illustrates an example of a functional block diagram of a MMMS Server System in accordance with a specific embodiment. In at least one embodiment, the MMMS Server System may be operable to perform and/or implement various types of functions, operations, actions, and/or other features such as, for example, one or more of those described or referenced herein (e.g., such as those previously described with respect to FIGS. 1 and 2).

In at least one embodiment, the MMMS Server System may include a plurality of components operable to perform and/or implement various types of functions, operations, actions, and/or other features such as, for example, one or more of the following (or combinations thereof):

Artist Performance and Venue Tracking System(s) 671
 Artist Management System(s) 675
 Station Management System(s) 672
 Content Delivery/Streaming System(s) 673
 Venue Management System(s) 679
 User Management System(s) 675
 Media Storage System(s) 676
 Financial Transaction Server(s) 677
 Media Transcoding Server(s) 678
 Context Interpreter (e.g., 602) which, for example, may be operable to automatically and/or dynamically analyze contextual criteria relating to a given transaction, and automatically determine or identify the type of transaction to be performed. According to different embodiments, examples of contextual criteria which may be analyzed may include, but are not limited to, one or more of the following (or combinations thereof):
  location-based criteria (e.g., geolocation of client device, geolocation of agent device, etc.)
  time-based criteria
  identity of user
  identity of artist
  user profile information
  transaction history information
  recent user activities
  etc.
 Time Synchronization Engine (e.g., 604) which, for example, may be operable to manages universal time synchronization (e.g., via NTP and/or GPS)
 Search Engine (e.g., 628) which, for example, may be operable to search for transactions, logs, items, accounts, options in the TIS databases
 Configuration Engine (e.g., 632) which, for example, may be operable to determine and handle configuration of various customized configuration parameters for one or more devices, component(s), system(s), process(es), etc.
 Time Interpreter (e.g., 618) which, for example, may be operable to automatically and/or dynamically modify or change identifier activation and expiration time(s) based on various criteria such as, for example, time, location, transaction status, etc.
 Authentication/Validation Component(s) (e.g., 647) (password, software/hardware info, SSL certificates) which, for example, may be operable to perform various types of authentication/validation tasks such as, for example, one or more of the following (or combinations thereof):
  verifying/authenticating devices,
  verifying passwords, passcodes, SSL certificates, biometric identification information, and/or other types of security-related information
  verify/validate activation and/or expiration times
  etc.
 Transaction Processing Engine (e.g., 622) which, for example, may be operable to handle various types of transaction processing tasks such as, for example, one or more of the following (or combinations thereof):
  identifying/determining transaction type
  determining which payment gateway(s) to use
  associating databases information to identifiers
  etc.
 OCR Processing Engine (e.g., 634) which, for example, may be operable to perform image processing and optical character recognition of images such as those captured by a mobile device camera, for example.
 Database Manager (e.g., 626) which, for example, may be operable to handle various types of tasks relating to database updating, database management, database access, etc. In at least one embodiment, the Database Manager may be operable to manage databases, MMMS Device Application databases, etc.

- Log Component(s) (e.g., 610) which, for example, may be operable to generate and manage transactions history logs, system errors, connections from APIs, etc.
- Status Tracking Component(s) (e.g., 612) which, for example, may be operable to automatically and/or dynamically determine, assign, and/or report updated transaction status information based, for example, on the state of the transaction. In at least one embodiment, the status of a given transaction may be reported as one or more of the following (or combinations thereof): Completed, Incomplete, Pending, Invalid, Error, Declined, Accepted, etc.
- Gateway Component(s) (e.g., 614) which, for example, may be operable to facilitate and manage communications and transactions with external Payment Gateways.
- Web Interface Component(s) (e.g., 608) which, for example, may be operable to facilitate and manage communications and transactions with TIS web portal(s).
- API Interface(s) to MMMS Server System(s) (e.g., 646) which, for example, may be operable to facilitate and manage communications and transactions with API Interface(s) to MMMS Server System(s)
- API Interface(s) to 3rd Party Server System(s) (e.g., 648) which, for example, may be operable to facilitate and manage communications and transactions with API Interface(s) to 3rd Party Server System(s)
- Ticketing Reservation and Purchasing Component(s) (e.g., 649), which, for example, may be configured or designed to facilitate, initiate and/or perform activities/operations relating to reservation and/or purchasing of tickets to events such as live performances at one or more venues.
- OCR Processing Engine (e.g., 634) which, for example, may be operable to perform image processing and optical character recognition of images such as those captured by a mobile device camera, for example.
- At least one processor 610. In at least one embodiment, the processor(s) 610 may include one or more commonly known CPUs which are deployed in many of today's consumer electronic devices, such as, for example, CPUs or processors from the Motorola or Intel family of microprocessors, etc. In an alternative embodiment, at least one processor may be specially designed hardware for controlling the operations of the mobile client system. In a specific embodiment, a memory (such as non-volatile RAM and/or ROM) also forms part of CPU. When acting under the control of appropriate software or firmware, the CPU may be responsible for implementing specific functions associated with the functions of a desired network device. The CPU preferably accomplishes one or more these functions under the control of software including an operating system, and any appropriate applications software.
- Memory 616, which, for example, may include volatile memory (e.g., RAM), non-volatile memory (e.g., disk memory, FLASH memory, EPROMs, etc.), unalterable memory, and/or other types of memory. In at least one implementation, the memory 616 may include functionality similar to at least a portion of functionality implemented by one or more commonly known memory devices such as those described herein and/or generally known to one having ordinary skill in the art. According to different embodiments, one or more memories or memory modules (e.g., memory blocks) may be configured or designed to store data, program instructions for the functional operations of the mobile client system and/or other information relating to the functionality of the various Mobile Transaction techniques described herein. The program instructions may control the operation of an operating system and/or one or more applications, for example. The memory or memories may also be configured to store data structures, metadata, identifier information/images, and/or information/data relating to other features/functions described herein. Because such information and program instructions may be employed to implement at least a portion of the MMMS System techniques described herein, various aspects described herein may be implemented using machine readable media that include program instructions, state information, etc. Examples of machine-readable media include, but are not limited to, magnetic media such as hard disks, floppy disks, and magnetic tape; optical media such as CD-ROM disks; magneto-optical media such as floptical disks; and hardware devices that are specially configured to store and perform program instructions, such as read-only memory devices (ROM) and random access memory (RAM). Examples of program instructions include both machine code, such as produced by a compiler, and files containing higher level code that may be executed by the computer using an interpreter.
- Interface(s) 606 which, for example, may include wired interfaces and/or wireless interfaces. In at least one implementation, the interface(s) 606 may include functionality similar to at least a portion of functionality implemented by one or more computer system interfaces such as those described herein and/or generally known to one having ordinary skill in the art.
- Device driver(s) 642. In at least one implementation, the device driver(s) 642 may include functionality similar to at least a portion of functionality implemented by one or more computer system driver devices such as those described herein and/or generally known to one having ordinary skill in the art.
- One or more display(s) 635. According to various embodiments, such display(s) may be implemented using, for example, LCD display technology, OLED display technology, and/or other types of conventional display technology. In at least one implementation, display(s) 635 may be adapted to be flexible or bendable. Additionally, in at least one embodiment the information displayed on display(s) 635 may utilize e-ink technology (such as that available from E Ink Corporation, Cambridge, Mass., www.eink.com), or other suitable technology for reducing the power consumption of information displayed on the display(s) 635.
- Email Server Component(s) 636, which, for example, may be configured or designed to provide various functions and operations relating to email activities and communications.
- Web Server Component(s) 637, which, for example, may be configured or designed to provide various functions and operations relating to web server activities and communications.
- Messaging Server Component(s) 638, which, for example, may be configured or designed to provide various functions and operations relating to text messaging and/or other social network messaging activities and/or communications.
- Etc.

Ticket Reservations & Purchasing Functionality

In at least one embodiment, the MMMS System may be configured or designed to provide ticketing reservation and purchasing functionality for enabling and/or facilitating users in performing activities/operations relating to reservation and/or purchasing of tickets to events such as live performances at one or more venues. For example, in at least one embodiment, the DeliRadio System may include a Ticketing Reservation/Purchase System ("TRPS") which, for example, may be configured or designed to automatically and/or dynamically identify event ticketing reservation/purchasing opportunities in advance of tickets going on sale to the public. According to different embodiments, various aspects of the MMMS System's ticketing reservation and purchasing functionality may include, but are not limited to, one or more of the following (or combinations thereof):

Venue Implementation: In at least one embodiment, the MMMS System may be configured or designed to provide ticketing reservation and purchasing functionality for enabling and/or facilitating users in performing activities/operations relating to reservation and/or purchasing of tickets to events such as live performances at one or more venues. For example, in at least one embodiment, the MMMS System may include a Ticketing Reservation/Purchase System ("TRPS") which may be configured or designed to automatically and/or dynamically identify event ticketing reservation/purchasing opportunities in advance of tickets going on sale to the public. In one embodiment, reservation and/or purchasing of tickets by DeliRadio users may be facilitated by 3rd party system(s)/component(s). In at least one embodiment, at some point after the Initial Ticket On-Sale event (e.g., approximately 1-5 days after), the venue hosting the event (e.g., concert/show) would set the Reservation Allotment for how many reservations it would guarantee/allot for a specific concert. In one embodiment, to determine the Reservation Allotment, the venue may take their "Sellable Capacity" less "Anticipated Sales", and the remaining number may be the Anticipated Unsold Tickets ("AUTs"). For example, a venue with a Sellable Capacity of 500 and Anticipated Sales of 300 would have 200 AUTs remaining The TRPS would multiply the venue's AUT by a "super percent" multiplier (e.g., 100+%), thus creating the Reservation Allotment for the event. One reason for the super percentage multiplier is that not all reservations may be converted to a ticket purchase.

Customer Interaction: In at least one embodiment, once the Reservation Allotment is available in the TRPS, DeliRadio users may be able to view a Concert Page for a particular event. On the Concert Page, the user may view (e.g., in real-time) information relating to the total number of tickets sold for that event and the number of reservations available. DeliRadio users may be able to "buy now" for immediate ticket purchase and/or be able to make ticket reservations (e.g., for one or more persons). In one embodiment where DeliRadio users may "star" particular venues, DeliRadio users could receive an update when an event is scheduled at one of their starred venues, and by clicking on the update, they may be directed to the Concert Page for that event, where they could purchase tickets and/or make Reservations.

Making the Reservation: In at least one embodiment, when making the Reservation, the Reservation Host may be able to designate other DeliRadio users (Reservation Recipients) to receive an "invitation to accept the Reservation." This message may be sent within DeliRadio to Reservation Recipients. The Host and the Recipients would have a window of time in which to convert their Reservations into Ticket purchases. Once the Host has received confirmation from Recipients of their intent to attend the show as a group (e.g., via DeliRadio SMS, text message, phone call, in person, etc.), the Reservation Host may automatically handle the Ticket purchases on behalf of the Reservation Group.

Picking up Tickets purchased through TRPS: In at least one embodiment, the venue keeps track of tickets purchased through at least one Reservation Group in the TRPS. The Host of at least one Reservation Group is now "hosting" a "guest list" of attendees at the event. At least one member of the Reservation Group arrives at the venue, informs Will Call that they're on the Reservation Host's Guest List, presents ID, and receives their Ticket.

Reservation Incentives: In at least one embodiment, venues participating in the TRPS may be able to access their Venue Dashboard, select a particular event, and set any incentives/discounts it wants to offer for that event. The Reservation Host would then be eligible for deals as an incentive for buying AUTs in bulk, for example. In at least one embodiment, DeliRadio users who reserve or purchase their tickets via the DeliRadio System may receive other types of promotional offers or benefits such as, for example:

Bulk Ticket Discount: By way of example, 5 tickets for the price of 4, with the discount spread across the price of one or more tickets, thus benefiting the Reservation Group. The venue is only getting income from 4 ticket sales, but the event will be attended by 5 persons who may generate other income for the venue while attending the show.

Promotional Offers: drink tickets, venue swag, VIP privileges, priority seat reservations, discount coupons, etc.

Future Show Discounts: Discounts on Ticket purchases for future shows at that venue, or at shows among various venues in a Venue Group.

Vendor Affiliate Discounts: Discounts at vendors/merchants in the same neighborhood as the venue.

Venue "Points": Redeemable by the Host at the venue at some later date for any of the above.

TRPS Monetization: Monetization of the TRPS could take one or more of the following forms (or combinations thereof): Per Ticket Fee; Per Order Fee; and/or Per Show Fee.

Example Models for Sponsorship Sales: (1) local/national sponsor underwrites one or more fees and is perceived as paying one or more convenience fees related to Tickets purchased through the TRPS for that event, in exchange for brand goodwill and/or user data provided by DeliRadio; (2) local/national sponsor pays a flat fee per show to buy a relationship with a specific demographic and receives demographic specific user data from DeliRadio; (3) local/national sponsor pays a flat fee per show and offers product giveaways and/or raffle entries for a contest.

Example "Reservation" Definitions: (1) a socially broadcast interest in attending a particular event (e.g., a "like" for an event that others may see), and then helping that general interest culminate in a tipping point where everyone wants to convert their Reservation into Ticket Buys to be guaranteed admission; (2) an option to purchase a Ticket; (3) an opportunity for an individual to get a group of people to buy multiple tickets, and by doing so, the organizer (host) receives something of value from the venue; (4) a discrete unit of the allocation of Anticipated Unsold Tickets multiplied by a super-percentage (100+%)

According to different embodiments, a reservation window may close the sooner of (1) x days before the event or (2) X % of Tickets sold. Alternatively, X days after the Reservation is made, but no later than X days before the event.

Example Benefits/Advantages of MMMS System TRPS: Various benefits/advantages of the MMMS System TRPS may include, for example: the limited quantity of Reservations; the limited time window in which to convert Reservations into Ticket Buys; and/or the social broadcast nature of the Reservation (allowing one or more DeliRadio users to see the status of one or more Reservations for a given show at any time.

Figure 7:
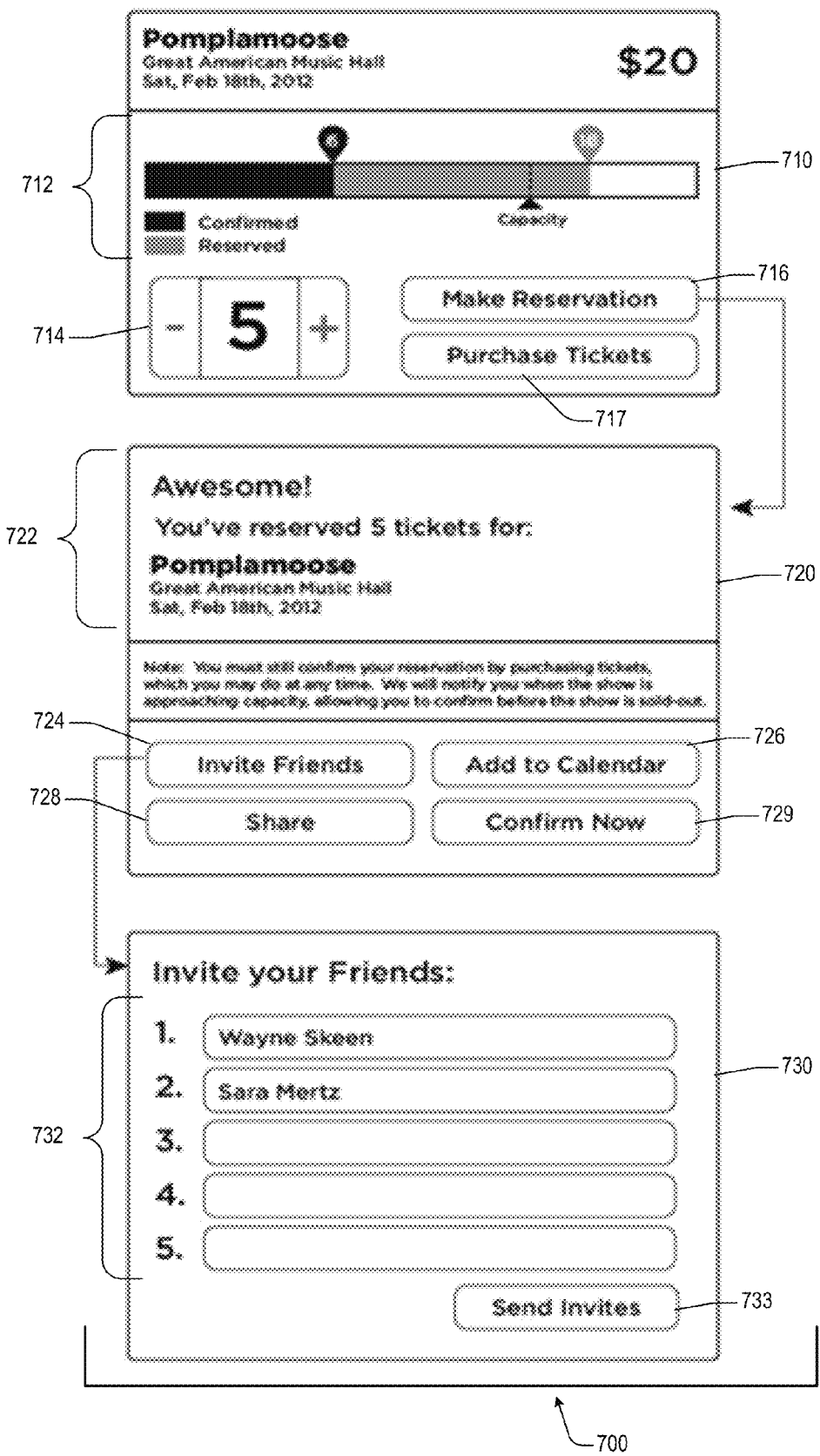
FIG. 7 shows example screenshots of a sequence of several Ticket Reservation GUIs.

FIG. 7 shows example screenshots of a sequence of several Ticket Reservation GUIs which may be configured or designed to provide ticketing reservation and purchasing functionality for enabling and/or facilitating users in performing activities/operations relating to reservation and/or purchasing of tickets to events such as live performances at one or more venues. For example, in at least one embodiment, the DeliRadio System may include a Ticketing Reservation/Purchase System ("TRPS") which may be configured or designed to automatically and/or dynamically identify event ticketing reservation/purchasing opportunities in advance of tickets going on sale to the public. In one embodiment, reservation and/or purchasing of tickets by DeliRadio users may be facilitated by 3rd party system(s)/component(s). In at least one embodiment, at some point after the Initial Ticket On-Sale event (e.g., approximately 1-5 days after), the venue hosting the event (e.g., concert/show) would set the Reservation Allotment for how many reservations it would guarantee/allot for a specific concert. In one embodiment, to determine the Reservation Allotment, the venue may take their "Sellable Capacity" less "Anticipated Sales", and the remaining number may be the Anticipated Unsold Tickets ("AUTs"). For example, a venue with a Sellable Capacity of 500 and Anticipated Sales of 300 would have 200 AUTs remaining The TRPS would multiply the venue's AUT by a "super percent" multiplier (e.g., 100+%), thus creating the Reservation Allotment for the event. One reason for the super percentage multiplier is that not all reservations may be converted to a ticket purchase.

In at least one embodiment, once the Reservation Allotment is available in the TRPS, DeliRadio users may be able to view a Concert Page for a particular event (e.g., 710). On the Concert Page, the user may view (e.g., in real-time) information (e.g., 712) relating to the total number of tickets sold for that event, and the number of reservations available. DeliRadio users may be able to indicate the quantity of tickets to be purchased/reserved (e.g., via GUI portion 714), and elect to purchase tickets 717 for immediate ticket purchase and/or elect to make reservations 716 (e.g., for one or more persons). In one embodiment where DeliRadio users may "star" particular venues, DeliRadio users could receive an update when an event is scheduled at one of their starred venues, and by clicking on the update, they may be directed to the Concert Page for that event, where they could purchase tickets and/or make reservations.

As illustrated in the example embodiment of FIG. 7, at 720 is assumed that the user has initiated the process of reserving tickets for a selected show at a specific venue. In at least one embodiment, the user may be presented with options for performing additional tasks such as, for example: invite friends 724; add to event to calendar 726; post or share information relating to the user's ticket reservation activities (e.g., in the DeliRadio System and/or at one or more social networks); confirm ticket reservations 729; purchased the reserved tickets; make additional ticket reservations/purchases; pre-purchase items of merchandise available at the upcoming show; elect to receive updates relating to the selected show; elect to join the mailing list of the artist/band and/or venue which will be hosting the show; etc.

In at least one embodiment, when making the Reservation, the Reservation Host may be able to designate other DeliRadio users (Reservation Recipients) to receive an invitation to accept the Reservation (e.g., as shown at 730). This message may be sent within DeliRadio to Reservation Recipients. The Host and the Recipients would have a window of time in which to convert their Reservations into Ticket purchases. Once the Host has received confirmation from Recipients of their intent to attend the show as a group (e.g., via DeliRadio SMS, text message, phone call, in person, etc.), the Reservation Host may automatically handle the Ticket purchases on behalf of the Reservation Group. In at least one embodiment, the venue keeps track of tickets purchased through at least one Reservation Group in the TRPS. The Host of at least one Reservation Group is now "hosting" a "guest list" of attendees at the event. At least one member of the Reservation Group arrives at the venue, informs Will Call that they're on the Reservation Host's Guest List, presents ID, and receives their Ticket.

FIGS. 8-15 illustrate example screenshots of various graphical user interfaces (GUIs) which may be used to facilitate, initiate and/or perform various operation(s) and/or action(s) relating event ticket reservations and purchasing operations implemented via a user's mobile device. According to specific embodiments, at least a portion of the content and functionality of ticked reservation and purchasing GUIs illustrated in FIGS. 8-15 may be implemented at the DeliRadio System.

FIG. 8 shows an example embodiment illustrating a view of the DeliRadio Ticket Reservation icon 830a from the DeliRadio Player GUI 801. In at least one embodiment, a user of the mobile device may click on the Ticket Reservation icon 830a to access additional GUIs for facilitating event-related online ticket reservations and purchasing transactions.

In the present example, it is assumed that the user has tapped the Ticket Reservation icon 830a of FIG. 8, and has been directed to the artist's Event Information GUI 901 (FIG. 9), which has been configured or designed to display listings of upcoming events associated with the identified artist (e.g., Angelo Moore). In at least one embodiment, as illustrated in the example embodiment of FIG. 9, events (e.g., 912, 914) where ticket reservations are determined to be available may include display of a respective Ticket Reservation icon (e.g., 912a, 914a) adjacent to each corresponding event. In at least one embodiment, the DeliRadio System may dynamically determine (e.g., in real-time) available ticket reservation opportunities (if any) for each of the events listed in the artist's upcoming events list 910.

In the present example, it is assumed that the user has tapped on event listing 912 of FIG. 9 (titled "Brooklyn Bowl"). In response, as illustrated in the example embodiment of FIG. 10, an Artist-Event GUI 1001 may be displayed, which may be configured or designed to provide functionality for enabling the user to initiate, and/or perform one or more of the following operation(s), action(s), and/or feature(s) (or combinations thereof):

View and/or obtain additional information (e.g., 1012, 1014) relating to the selected artist event.

Listen to one or more the artists performing at the event together in one station (e.g., by tapping on "play" button 1022 to initiate playback of a streaming radio station).

Get directions to the event (e.g., by tapping on map portion 1010).

Share the event with friends on their social networks (e.g., 1034).

Initiate ticket reservations for the selected event (e.g., 1032).

Return to the Player GUI of the artist the user is currently listening to (e.g., by tapping on portion 1040).

Figure 10:
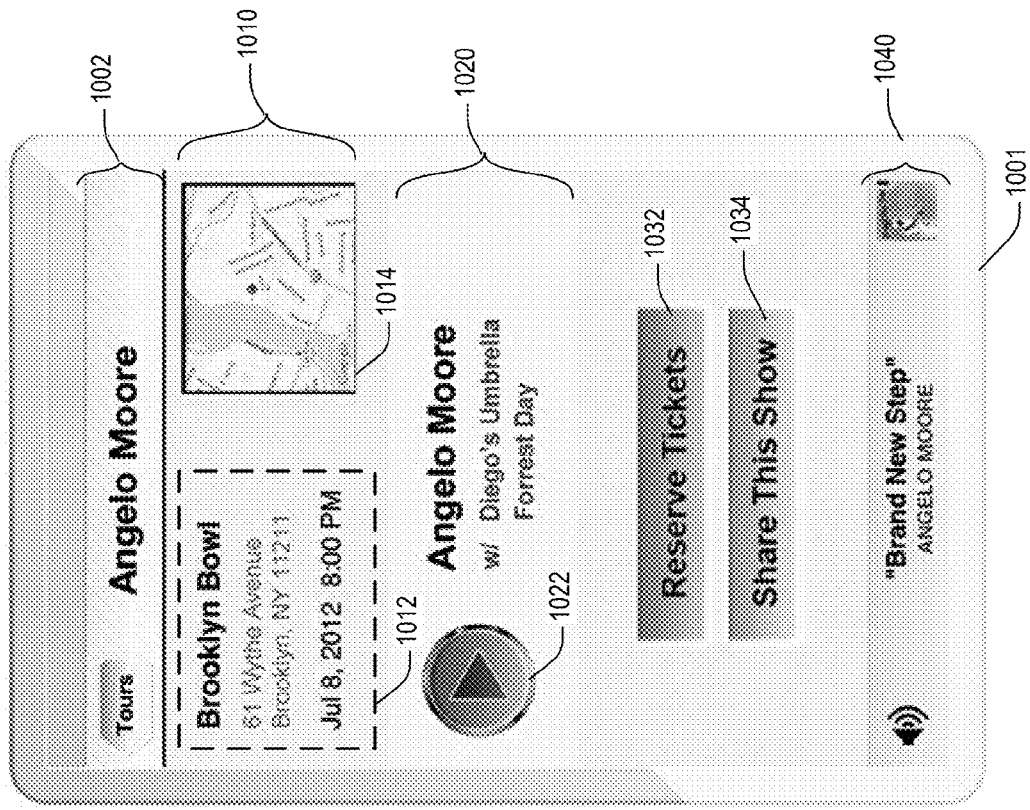

In the present example, it is assumed that the user has tapped "Reserve Tickets" button 1032 of FIG. 10. In response, as illustrated in the example embodiment of FIG. 11, an Event-Reservation GUI 1101 may be displayed, which may be configured or designed to provide functionality for enabling the user to initiate, and/or perform one or more of the following operation(s), action(s), and/or feature(s) (or combinations thereof):

View and/or obtain additional information (e.g., 1110) relating to the selected event (e.g., Artists to be performing, Date, Show Time, etc.).

View and/or obtain additional information (e.g., 1120) relating to the venue (e.g., venue name, venue location, etc.).

View and/or obtain additional information (e.g., 1120) relating to pricing for ticket reservations/purchases for the selected event.

Input the number of tickets to be reserved or purchased for the selected event (e.g., 1130).

Initiate ticket reservations for the selected event (e.g., 1138) for one or more persons.

Return to the Player GUI of the artist the user is currently listening to (e.g., by tapping on portion 1140).

In the present example, it is assumed that the user has provided input indicating that the user wishes to reserve 4 tickets (e.g., as shown at 1130) for the identified show/event. It is further assumed that the user then taps the "Make Reservation" button 1138. In at least one embodiment, after the user has tapped on the "Make Reservation" button 1138, a confirmation message may be displayed on the mobile device prompting the user to confirm the reservation of the requested number of tickets for the identified event. In some embodiments, the confirmed ticket reservations may be held only for a specified duration of time before the reservations automatically expire. If the user does not purchase the reserved tickets within the specified time duration, the reservations may automatically expire. In some embodiments, a separate reservation fee may be charged for the privilege of reserving or holding tickets to a given event.

In some embodiments, the DeliRadio System may be configured or designed to enable the user to reserve a desired number of tickets for a selected event. Additionally, the DeliRadio System may be configured or designed to facilitate the user in identifying and inviting one or more friends (or other persons) to accept one or more of the ticket reservations made by the user. One example of this feature is illustrated in FIG. 12.

Figure 11:
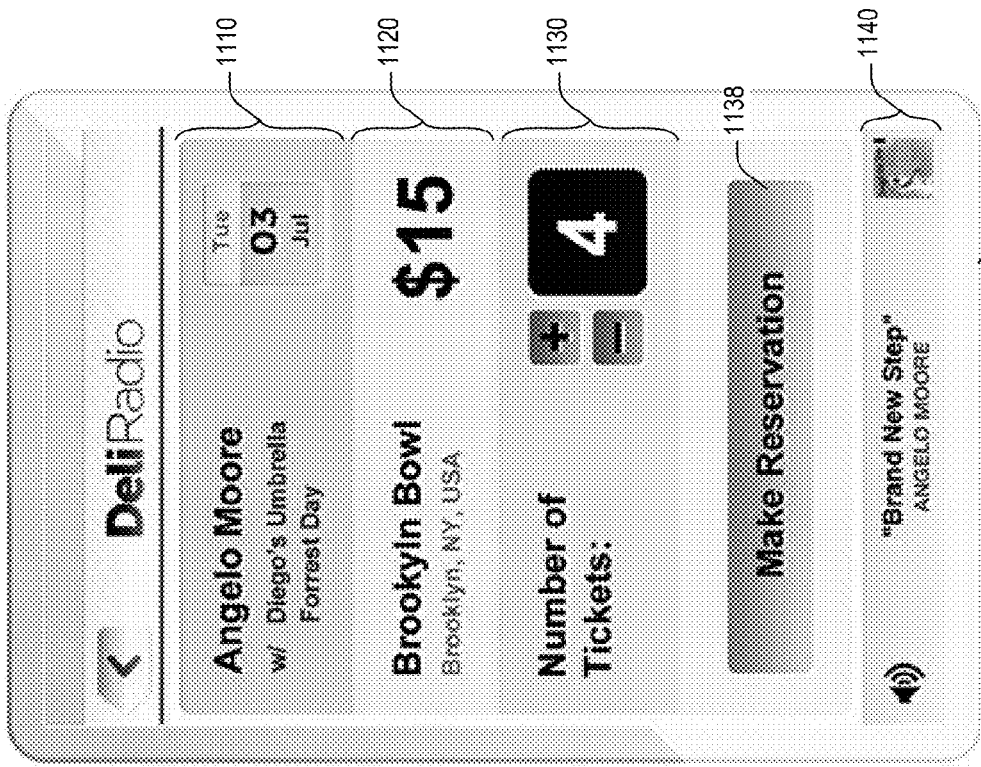
Figure 12:
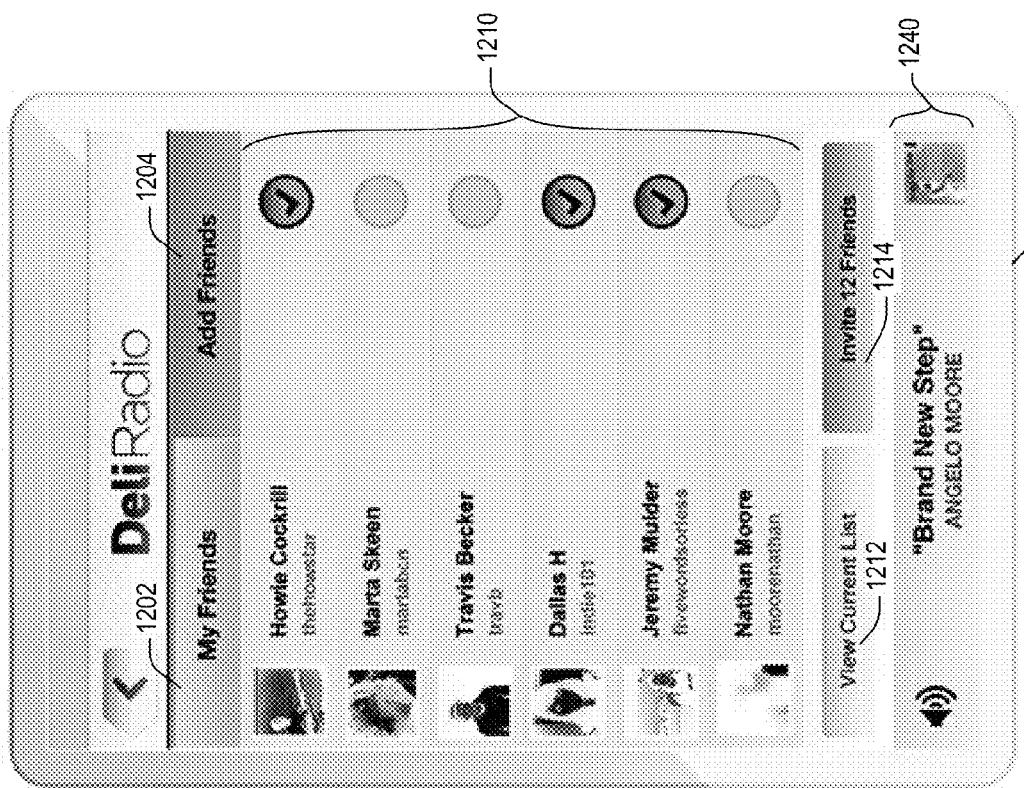

In the present example, after the user has reserved a selected number of tickets for a selected show, as described, for example, with respect to FIG. 11, the user may be presented with a Reservation Invitation GUI, such as, for example, Reservation Invitation GUI 1201 of FIG. 12. In at least one embodiment, the Reservation Invitation GUI may be configured or designed to facilitate and/or enable the user to identify and select one or more friends (or other persons) 1210 for the purpose of inviting the selected friends/persons to accept one or more of the ticket reservations made by the user for the selected show. The user may choose from their DeliRadio Friends (as shown, for example, in FIG. 12) and/or may select from a list of contacts outside the DeliRadio System such as via Facebook, Twitter, mobile device address book, etc. According to different embodiments, the invitations may be sent to the selected recipients via one or more of the following (or combinations thereof): via a DeliRadio System messaging service, via one or more social network messaging service(s) (e.g., Facebook, Twitter, etc.), via email, via SMS (as indicated in the "Add Friends" tab), etc. In the specific example embodiment of FIG. 12, it is assumed that the user has selected to invite 12 DeliRadio Friends to accept the 4 reservations. In at least one embodiment, when an invited recipient receives the invitation request, that recipient may perform one or more of the following types of activities (or combinations thereof):

Accept the reservation invitation.

Purchase one or more of the reserved tickets.

Decline the reservation invitation.

Forward the reservation invitation to one or more other persons. In at least one embodiment, the DeliRadio System may be configured or designed to only allow the invitation recipient to forward the reservation invitation to one or more other persons who share a common friendship connection with both the user who made the original ticket reservations and the recipient who is forwarding the reservation invitation.

Make additional ticket reservations for the selected show.

Send a personal communication back to the user who sent the reservation invitation.

Utilize features embedded in the received reservation invitation to view details or information relating to one or more of the following (or combinations thereof): details about the upcoming show; information about the artist(s) who will be performing at the show; information about the venue where the selected show will be performed; etc.

Utilize features embedded in the received reservation invitation to access and/or listen to a customized DeliRadio station which plays streamed music performed by one or more of the artist(s) who will be performing at the selected show.

Utilize features embedded in the received reservation invitation to access and/or listen to a customized DeliRadio station which plays streamed music performed by one or more of the artist(s) who will be performing at the selected show.

Etc.

Figure 13:
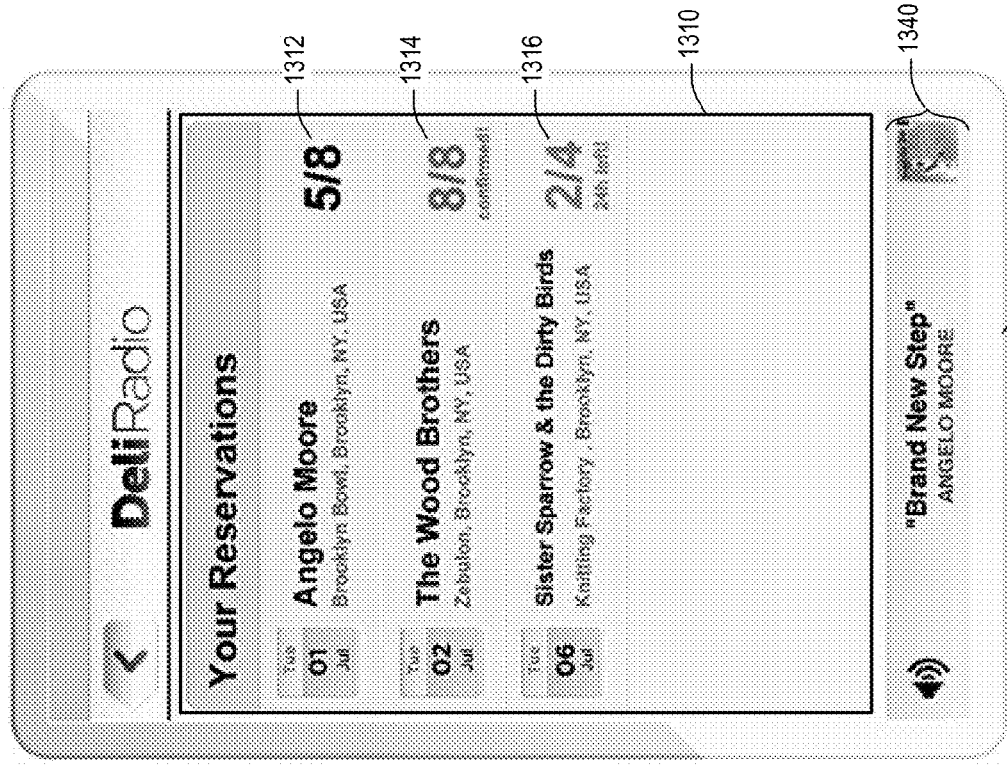

FIG. 13 shows an example embodiment of a User Reservation Status GUI 1301 in accordance with a specific embodiment. In the specific example embodiment of FIG. 13, the User Reservation Status GUI has been configured to present a list view of a user's upcoming reservations. In at least one embodiment, the User Reservation Status GUI may be configured or designed to display information relating to each of the user's existing reservations, as well as updated status information relating to each of the user's existing reservations. For example, as illustrated in the example embodiment of FIG. 13, the updated status information relating to reservation entry 1312 (for the Angelo Moore show) indicates that 5 reservation invitations have been confirmed or accepted out of a total of 8 reservations made by the user. Additionally, the updated status information relating to reservation entry 1316 (for the Sister Sparrow show) indicates that 2 reservation invitations have been confirmed or accepted out of a total of 4 reservations made by the user, and also indicates that the reservations (and/or reservation invitations) are due to expire if the reservations are not ticketed within 24 hours. As illustrated in FIG. 13, colors may be used to indicate a current state or current status of each respective reservation.

In the present example, it is assumed that the user taps or clicks on reservation entry 1312 of the User Reservation Status GUI. In response, the user may be presented with a Reservation Details GUI as illustrated by 1401 of FIG. 14. As illustrated in the example embodiment of FIG. 14, the Reservation Details GUI 1401 may present the user with a variety of information and/or other types of functionality relating to the selected reservation such as, for example, one or more of the following (or combinations thereof):

- Details about the upcoming show associated with the selected reservation (e.g., 1412).
- Information about the artist(s) who will be performing at the show (e.g., 1412).
- Information about the venue where the selected show will be performed (e.g., 1412).
- Information relating to confirmations from friends who have accepted the user's invitation for a reserved ticket 1414 (e.g., 1414).
- Information relating to the user's remaining available reserved tickets associated with the selected reservation (e.g., 1412, 1414).
- Functionality for sending out additional reservation invitations to additional persons (e.g., 1422).
- Functionality for sending communications to one or more of the reservation invitation recipients (e.g., 1424).
- Functionality for viewing additional information relating to currently outstanding and/or declined reservation invitations for the selected show (e.g., 1426).
- Functionality for accepting or confirming a ticket reservation for the selected show (e.g., 1428).
- Functionality for to access and/or listen to a customized DeliRadio station which plays streamed music performed by one or more of the artist(s) who will be performing at the selected show (e.g., 1440).

Thus, for example, in at least one embodiment, the user may choose to invite more friends; send a message via email or SMS to confirmed invitees; view the status of current outstanding and declined invitations; confirm the ticket reservations with the DeliRadio System; etc.

Figure 15:
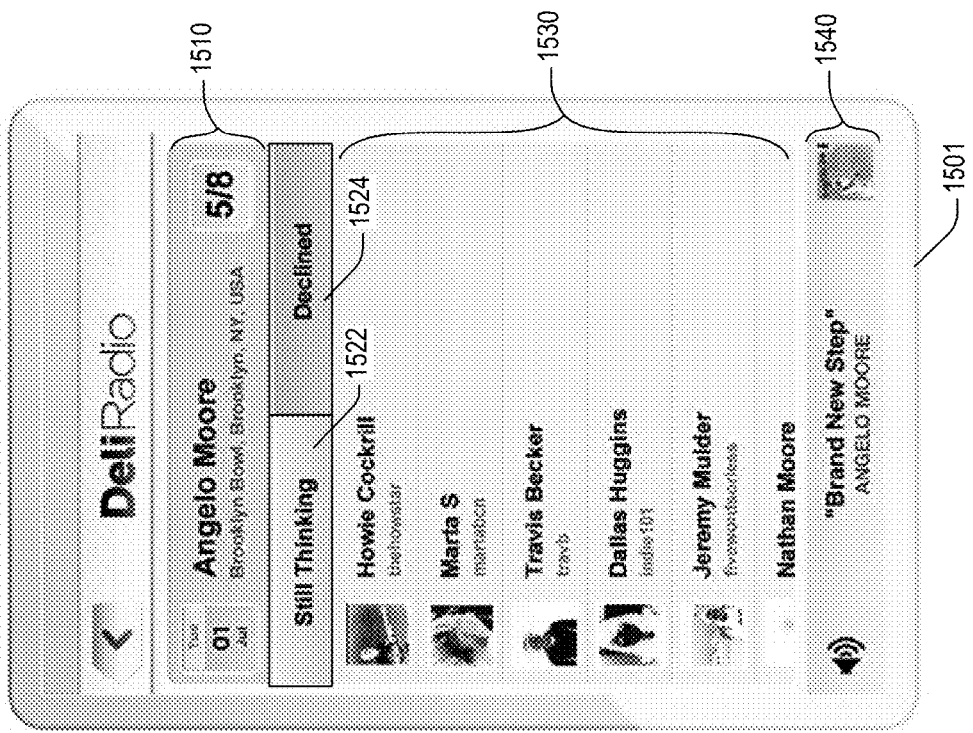
Figure 14:
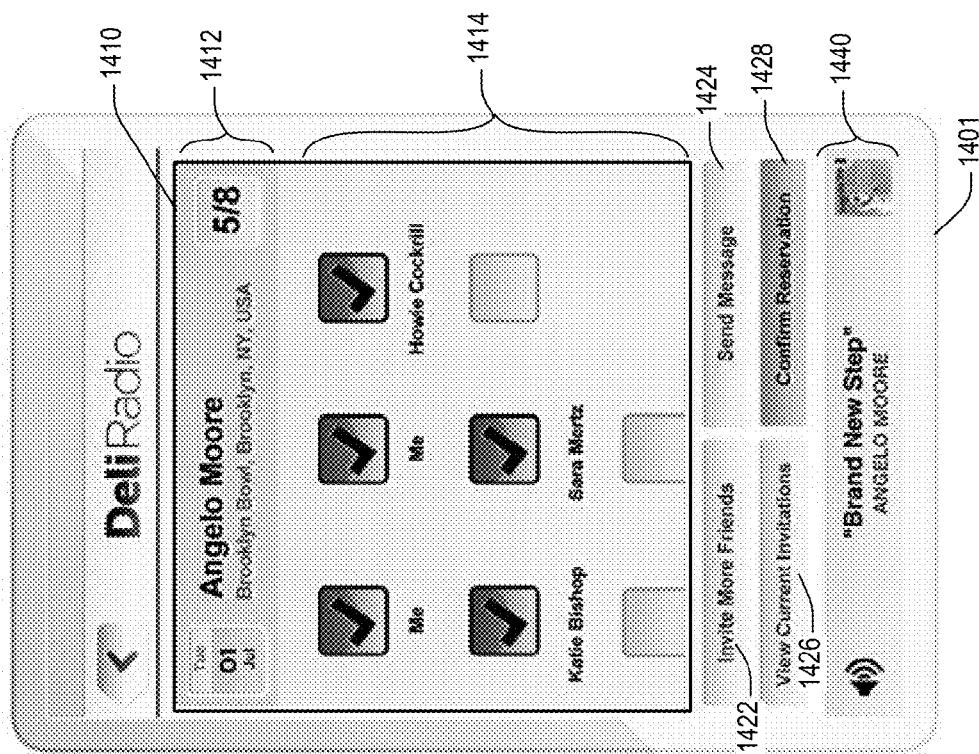

In one embodiment, if the user taps or clicks on the "View Current Invitations" button 1426, the user may then be presented with an Invitation Status GUI such as that illustrated by 1501 of FIG. 15. As illustrated in the example embodiment of FIG. 15, the Invitation Status GUI may be configured or designed to enable the user to view additional information relating to currently outstanding and/or declined reservation invitations for the selected show.

In at least one embodiment, when a user elects to confirm a ticket reservation via one of the DeliRadio System GUIs, a notification message may be automatically generated by the DeliRadio System and sent out to one or more persons which, for example, may include one or more of the following (or combinations thereof): the user who made the reservation (if different from the confirming user), one or more of the reservation invitation recipients (e.g., 1414), one or more of the confirming user's friends who have also purchased the reserved a ticket for the same show, etc.

Additionally, in some embodiments, when a user elects to confirm a ticket reservation via one of the DeliRadio System GUIs, the user may be presented with a Ticket Purchasing GUI which may be configured or designed to facilitate the user in purchasing a ticket corresponding to the confirmed ticket reservation.

Although several example embodiments of one or more aspects and/or features have been described in detail herein with reference to the accompanying drawings, it is to be understood that aspects and/or features are not limited to these precise embodiments, and that various changes and modifications may be effected therein by one skilled in the art without departing from the scope of spirit of the invention(s) as defined, for example, in the appended claims.

It is claimed:

1. A computer implemented method for facilitating electronic commerce via a computer network, the method comprising causing at least one processor to execute a plurality of instructions for:
    - determining a first set of filter criteria for use in performing a database search for music related information matching the first set of filter criteria, the first set of filter criteria including geolocation filter criteria indicating a first geographic location;
    - identifying, using the geolocation filter criteria, a first set of artists or bands ("artists/bands") that are scheduled to perform at least one live performance within a first geographic region, wherein the first geographic region includes the first geographic location;
    - identifying, using the identified first set of artists or bands, a filtered set of songs or tracks ("songs/tracks") which are performed by or recorded by at least one of the artists/bands of the first set of artists/bands;
    - dynamically creating, using the filtered set of songs/tracks, a filtered streaming media playlist, wherein the filtered streaming media playlist includes a first portion of selected songs/tracks from the identified filtered set of songs/tracks;
    - accessing, using the identified first set of artists or bands, first ticketing information relating to a first upcoming live performance of a first artist or band ("artist/band") which is scheduled to be performed in the first geographic region;
    - generating, using information relating to the filtered streaming media playlist, a first set of instructions for causing a streaming media graphical user interface ("Streaming Media GUI") to be displayed at an end user's device, wherein the first set of instructions include instructions for configuring the Streaming Media GUI to enable an end user to initiate, via interaction with the Streaming Media GUI, a streamed playback of one or more of the first portion of selected songs/tracks associated with the streaming media playlist; and
    - generating, using the first ticketing information, a second set of instructions for causing the Streaming Media GUI to display, at the end user's device, first performance ticketing information relating to the first upcoming live performance of the first artist or band ("artist/band"), wherein the second set of instructions include instructions for configuring the Streaming Media GUI to enable an end user to initiate, via interaction with the Streaming Media GUI, at least one ticketing transaction relating a reservation and/or a purchase of at least one ticket for the first upcoming live performance.

2. The method of claim 1 further comprising:
    - receiving a first set of user input instructions, the first set of user input instructions being generated from the end user's device in response to user interaction with the Streaming Media GUI, the first set of user input instructions including a request to access ticketing information relating to the first upcoming live performance;
    - generating, in response to the first set of user input instructions, a third set of instructions for causing a Ticketing graphical user interface ("Ticketing GUI") to be displayed at an end user's device, wherein the third set of instructions include instructions for configuring the Ticketing GUI to enable an end user to:

initiate a ticket reservation transaction relating to a reservation of a first set of tickets for the first upcoming live performance;

initiate a ticket purchase transaction relating to a purchase of a second set of tickets for the first upcoming live performance;

initiate a ticket reservation invitation transaction for inviting at least one identified recipient to accept at least one reserved ticket for the first upcoming live performance;

access updated ticket reservation status information relating to one or more of the end user's ticket reservations; and access updated ticket reservation invitation status information relating to one or more of the end user's ticket reservation invitations.

3. The method of claim 1 further comprising:

receiving a first set of user input instructions, the first set of user input instructions being generated from the end user's device in response to user interaction with the Streaming Media GUI, the first set of user input instructions including instructions to initiate a ticket purchase transaction relating to the purchase of at least one ticket for the first upcoming live performance; and initiating, in response to the first set of user input instructions, a first ticket purchase transaction relating to the purchase of at least one ticket for the first upcoming live performance.

4. The method of claim 1 further comprising:

receiving a first set of user input instructions, the first set of user input instructions being generated from the end user's device in response to a first user's interaction with the Streaming Media GUI, the first set of user input instructions including instructions to initiate a ticket purchase transaction relating to the purchase of at least one ticket for the first upcoming live performance; and initiating, in response to the first set of user input instructions, a first ticket purchase transaction relating to a purchase of a first ticket for the first upcoming live performance.

5. The method of claim 1 further comprising:

receiving a first set of user input instructions, the first set of user input instructions being generated from the end user's device in response to a first user's interaction with the Streaming Media GUI, the first set of user input instructions including instructions to initiate a ticket purchase transaction relating to the purchase of at least one ticket for the first upcoming live performance;

initiating, in response to the first set of user input instructions, a first ticket purchase transaction relating to a purchase of a first ticket for the first upcoming live performance;

receiving a second set of user input instructions from the end user's device, the second set of user input instructions including instructions to initiate a ticket reservation transaction relating to a reservation of a first set of tickets for the first upcoming live performance;

initiating, in response to the second set of user input instructions, a first ticket reservation transaction relating to the reservation of the first set of tickets for the first upcoming live performance;

receiving a third set of user input instructions from the end user's device, the third set of user input instructions including instructions to invite at least one identified recipient to accept at least one of the reserved tickets of the first set of reserved tickets; and notifying, in response to the third set of user input instructions, the at least one identified recipient of a ticket reservation invitation to accept at least one of the reserved tickets of the first set of reserved tickets.

6. The method of claim 1 further comprising:

receiving a first set of user input instructions, the first set of user input instructions being generated from the end user's device in response to user interaction with the Streaming Media GUI, the first set of user input instructions including instructions to initiate a ticket reservation transaction relating to a reservation of a first set of tickets for the first upcoming live performance; and initiating, in response to the first set of user input instructions, a first ticket reservation transaction relating to the reservation of the first set of tickets for the first upcoming live performance.

7. The method of claim 1 further comprising:

receiving a first set of user input instructions, the first set of user input instructions being generated from the end user's device in response to a first user's interaction with the Streaming Media GUI, the first set of user input instructions including instructions to initiate a ticket reservation transaction relating to a reservation of a first set of tickets for the first upcoming live performance;

initiating, in response to the first set of user input instructions, a first ticket reservation transaction relating to a reservation of a first ticket for the first upcoming live performance;

associating the reserved first ticket with a first identifier representing the first user;

initiating, in response to the first set of user input instructions, a second ticket reservation transaction relating to a reservation of a second ticket for the first upcoming live performance;

determining, using input provided by the first user, a second identifier for identifying a specific person who is to be associated with the reserved second ticket; and associating the reserved second ticket with the second identifier.

8. The method of claim 1 further comprising:

receiving a first set of user input instructions, the first set of user input instructions being generated from the end user's device in response to user interaction with the Streaming Media GUI, the first set of user input instructions including instructions to initiate a ticket reservation transaction relating to a reservation of a first set of tickets for the first upcoming live performance;

initiating, in response to the first set of user input instructions, a first ticket reservation transaction relating to the reservation of the first set of tickets for the first upcoming live performance; and charging the end user a reservation fee for reserving the first set of tickets.

9. The method of claim 1 further comprising:

receiving a first set of user input instructions, the first set of user input instructions being generated from the end user's device in response to user interaction with the Streaming Media GUI, the first set of user input instructions including instructions to initiate a ticket reservation transaction relating to a reservation of a first set of tickets for the first upcoming live performance;

initiating, in response to the first set of user input instructions, a first ticket reservation transaction relating to the reservation of the first set of tickets for the first upcoming live performance;

receiving a second set of user input instructions from the end user's device, the second set of user input instructions including instructions to invite at least one identified recipient to accept at least one of the reserved tickets of the first set of reserved tickets; and notifying, in response to the second set of user input instructions, the at least one identified recipient of a ticket reservation invitation to accept at least one of the reserved tickets of the first set of reserved tickets.

10. The method of claim 1 further comprising:

receiving a first set of user input instructions, the first set of user input instructions being generated from the end user's device in response to user interaction with the Streaming Media GUI, the first set of user input instructions including instructions to initiate a ticket reservation transaction relating to a reservation of a first set of tickets for the first upcoming live performance;

initiating, in response to the first set of user input instructions, a first ticket reservation transaction relating to the reservation of the first set of tickets for the first upcoming live performance;

receiving a second set of user input instructions from the end user's device, the second set of user input instructions including instructions to invite at least one identified recipient to accept at least one of the reserved tickets of the first set of reserved tickets;

notifying, in response to the second set of user input instructions, the at least one identified recipient of a ticket reservation invitation to accept at least one of the reserved tickets of the first set of reserved tickets; and automatically tracking ticket reservation invitation responses from the at least one identified recipient.

11. The method of claim 1 further comprising:

receiving a first set of user input instructions, the first set of user input instructions being generated from the end user's device in response to user interaction with the Streaming Media GUI, the first set of user input instructions including instructions to initiate a ticket reservation transaction relating to a reservation of a first set of tickets for the first upcoming live performance;

initiating, in response to the first set of user input instructions, a first ticket reservation transaction relating to the reservation of a first set of tickets for the first upcoming live performance;

receiving a second set of user input instructions from the end user's device, the second set of user input instructions including instructions to invite at least one identified recipient to accept at least one of the reserved tickets of the first set of reserved tickets;

notifying, in response to the second set of user input instructions, the at least one identified recipient of a ticket reservation invitation to accept at least one of the reserved tickets of the first set of reserved tickets;

receiving notification of an acceptance of the ticket reservation invitation; and automatically initiating, in response to the acceptance of the ticket reservation invitation, a ticket purchase transaction relating to a purchase of a ticket for the first upcoming live performance.

12. The method of claim 1 further comprising:

receiving a first set of user input instructions, the first set of user input instructions being generated from the end user's device in response to user interaction with the Streaming Media GUI, the first set of user input instructions including instructions to initiate a ticket reservation transaction relating to a reservation of a first set of tickets for the first upcoming live performance;

initiating, in response to the first set of user input instructions, a first ticket reservation transaction relating to the reservation of a first set of tickets for the first upcoming live performance;

receiving a second set of user input instructions from the end user's device, the second set of user input instructions including instructions to invite at least one identified recipient to accept at least one of the reserved tickets of the first set of reserved tickets;

notifying, in response to the second set of user input instructions, the at least one identified recipient of a ticket reservation invitation to accept at least one of the reserved tickets of the first set of reserved tickets;

automatically tracking ticket reservation invitation responses from the at least one identified recipient; and generating a third set of instructions for causing a Ticketing graphical user interface ("Ticketing GUI") to be displayed at an end user's device, wherein the third set of instructions include instructions for configuring the Ticketing GUI to enable an end user to access updated ticket reservation status information relating to one or more of the end user's ticket reservations, and to access updated ticket reservation invitation status information relating to one or more of the end user's ticket reservation invitations, wherein the ticket reservation invitation status information includes information identifying which ticket reservation invitations have been accepted, which ticket reservation invitations have not yet been accepted, and/or which ticket reservation invitations have been declined.

13. A computer implemented system for facilitating electronic commerce via a computer network, the system comprising causing at least one processor to execute a plurality of instructions for:

determining a first set of filter criteria for use in performing a database search for music-related information matching the first set of filter criteria, the first set of filter criteria including geolocation filter criteria indicating a first geographic location;

identifying, using the geolocation filter criteria, a first set of artists or bands ("artists/bands") that are scheduled to perform at least one live performance within a first geographic region, wherein the first geographic region includes the first geographic location;

identifying, using the identified first set of artists or bands, a filtered set of songs or tracks ("songs/tracks") which are performed by or recorded by at least one of the artists/bands of the first set of artists/bands;

dynamically creating, using the filtered set of songs/tracks, a filtered streaming media playlist, wherein the filtered streaming media playlist includes a first portion of selected songs/tracks from the identified filtered set of songs/tracks;

accessing, using the identified first set of artists or bands, first ticketing information relating to a first upcoming live performance of a first artist or band ("artist/band") which is scheduled to be performed in the first geographic region;

generating, using information relating to the filtered streaming media playlist, a first set of instructions for causing a streaming media graphical user interface ("Streaming Media GUI") to be displayed at an end user's device, wherein the first set of instructions include instructions for configuring the Streaming Media GUI to enable an end user to initiate, via interaction with the Streaming Media GUI, a streamed playback of one or more of the first portion of selected songs/tracks associated with the streaming media playlist; and generating, using the first ticketing information, a second set of instructions for causing the Streaming Media GUI to display, at the end user's device, first performance ticketing information relating to the first upcoming live performance of the first artist or band ("artist/band"), wherein the second set of instructions include instructions for configuring the Streaming Media GUI to enable an end user to initiate, via interaction with the Streaming Media GUI, at least one ticketing transaction relating a reservation and/or a purchase of at least one ticket for the first upcoming live performance.

14. The system of claim 13 being further operable to cause the at least one processor to execute instructions for:

receiving a first set of user input instructions, the first set of user input instructions being generated from the end user's device in response to user interaction with the Streaming Media GUI, the first set of user input instructions including a request to access ticketing information relating to the first upcoming live performance;

generating, in response to the first set of user input instructions, a third set of instructions for causing a Ticketing graphical user interface ("Ticketing GUI") to be displayed at an end user's device, wherein the third set of instructions include instructions for configuring the Ticketing GUI to enable an end user to:

initiate a ticket reservation transaction relating to a reservation of a first set of tickets for the first upcoming live performance;

initiate a ticket purchase transaction relating to a purchase of a second set of tickets for the first upcoming live performance;

initiate a ticket reservation invitation transaction for inviting at least one identified recipient to accept at least one reserved ticket for the first upcoming live performance;

access updated ticket reservation status information relating to one or more of the end user's ticket reservations; and access updated ticket reservation invitation status information relating to one or more of the end user's ticket reservation invitations.

15. The system of claim 13 being further operable to cause the at least one processor to execute instructions for:

receiving a first set of user input instructions, the first set of user input instructions being generated from the end user's device in response to user interaction with the Streaming Media GUI, the first set of user input instructions including instructions to initiate a ticket purchase transaction relating to the purchase of at least one ticket for the first upcoming live performance; and initiating, in response to the first set of user input instructions, a first ticket purchase transaction relating to the purchase of at least one ticket for the first upcoming live performance.

16. The system of claim 13 being further operable to cause the at least one processor to execute instructions for:

receiving a first set of user input instructions, the first set of user input instructions being generated from the end user's device in response to a first user's interaction with the Streaming Media GUI, the first set of user input instructions including instructions to initiate a ticket purchase transaction relating to the purchase of at least one ticket for the first upcoming live performance; and initiating, in response to the first set of user input instructions, a first ticket purchase transaction relating to a purchase of a first ticket for the first upcoming live performance.

17. The system of claim 13 being further operable to cause the at least one processor to execute instructions for:

receiving a first set of user input instructions, the first set of user input instructions being generated from the end user's device in response to a first user's interaction with the Streaming Media GUI, the first set of user input instructions including instructions to initiate a ticket purchase transaction relating to the purchase of at least one ticket for the first upcoming live performance;

initiating, in response to the first set of user input instructions, a first ticket purchase transaction relating to a purchase of a first ticket for the first upcoming live performance;

receiving a second set of user input instructions from the end user's device, the second set of user input instructions including instructions to initiate a ticket reservation transaction relating to a reservation of a first set of tickets for the first upcoming live performance;

initiating, in response to the second set of user input instructions, a first ticket reservation transaction relating to the reservation of the first set of tickets for the first upcoming live performance;

receiving a third set of user input instructions from the end user's device, the third set of user input instructions including instructions to invite at least one identified recipient to accept at least one of the reserved tickets of the first set of reserved tickets; and notifying, in response to the third set of user input instructions, the at least one identified recipient of a ticket reservation invitation to accept at least one of the reserved tickets of the first set of reserved tickets.

18. The system of claim 13 being further operable to cause the at least one processor to execute instructions for:

receiving a first set of user input instructions, the first set of user input instructions being generated from the end user's device in response to user interaction with the Streaming Media GUI, the first set of user input instructions including instructions to initiate a ticket reservation transaction relating to a reservation of a first set of tickets for the first upcoming live performance; and initiating, in response to the first set of user input instructions, a first ticket reservation transaction relating to the reservation of the first set of tickets for the first upcoming live performance.

19. The system of claim 13 being further operable to cause the at least one processor to execute instructions for:

receiving a first set of user input instructions, the first set of user input instructions being generated from the end user's device in response to a first user's interaction with the Streaming Media GUI, the first set of user input instructions including instructions to initiate a ticket reservation transaction relating to a reservation of a first set of tickets for the first upcoming live performance;

initiating, in response to the first set of user input instructions, a first ticket reservation transaction relating to a reservation of a first ticket for the first upcoming live performance;

associating the reserved first ticket with a first identifier representing the first user;

initiating, in response to the first set of user input instructions, a second ticket reservation transaction relating to a reservation of a second ticket for the first upcoming live performance;

determining, using input provided by the first user, a second identifier for identifying a specific person who is to be associated with the reserved second ticket; and associating the reserved second ticket with the second identifier.

20. The system of claim 13 being further operable to cause the at least one processor to execute instructions for:

receiving a first set of user input instructions, the first set of user input instructions being generated from the end user's device in response to user interaction with the Streaming Media GUI, the first set of user input instructions including instructions to initiate a ticket reservation transaction relating to a reservation of a first set of tickets for the first upcoming live performance;

initiating, in response to the first set of user input instructions, a first ticket reservation transaction relating to the reservation of the first set of tickets for the first upcoming live performance; and charging the end user a reservation fee for reserving the first set of tickets.

21. The system of claim 13 being further operable to cause the at least one processor to execute instructions for:

receiving a first set of user input instructions, the first set of user input instructions being generated from the end user's device in response to user interaction with the Streaming Media GUI, the first set of user input instructions including instructions to initiate a ticket reservation transaction relating to a reservation of a first set of tickets for the first upcoming live performance;

initiating, in response to the first set of user input instructions, a first ticket reservation transaction relating to the reservation of the first set of tickets for the first upcoming live performance;

receiving a second set of user input instructions from the end user's device, the second set of user input instructions including instructions to invite at least one identified recipient to accept at least one of the reserved tickets of the first set of reserved tickets; and notifying, in response to the second set of user input instructions, the at least one identified recipient of a ticket reservation invitation to accept at least one of the reserved tickets of the first set of reserved tickets.

22. The system of claim 13 being further operable to cause the at least one processor to execute instructions for:

receiving a first set of user input instructions, the first set of user input instructions being generated from the end user's device in response to user interaction with the Streaming Media GUI, the first set of user input instructions including instructions to initiate a ticket reservation transaction relating to a reservation of a first set of tickets for the first upcoming live performance;

initiating, in response to the first set of user input instructions, a first ticket reservation transaction relating to the reservation of the first set of tickets for the first upcoming live performance;

receiving a second set of user input instructions from the end user's device, the second set of user input instructions including instructions to invite at least one identified recipient to accept at least one of the reserved tickets of the first set of reserved tickets;

notifying, in response to the second set of user input instructions, the at least one identified recipient of a ticket reservation invitation to accept at least one of the reserved tickets of the first set of reserved tickets; and automatically tracking ticket reservation invitation responses from the at least one identified recipient.

23. The system of claim 13 being further operable to cause the at least one processor to execute instructions for:

receiving a first set of user input instructions, the first set of user input instructions being generated from the end user's device in response to user interaction with the Streaming Media GUI, the first set of user input instructions including instructions to initiate a ticket reservation transaction relating to a reservation of a first set of tickets for the first upcoming live performance;

initiating, in response to the first set of user input instructions, a first ticket reservation transaction relating to the reservation of a first set of tickets for the first upcoming live performance;

receiving a second set of user input instructions from the end user's device, the second set of user input instructions including instructions to invite at least one identified recipient to accept at least one of the reserved tickets of the first set of reserved tickets;

notifying, in response to the second set of user input instructions, the at least one identified recipient of a ticket reservation invitation to accept at least one of the reserved tickets of the first set of reserved tickets;

receiving notification of an acceptance of the ticket reservation invitation; and automatically initiating, in response to the acceptance of the ticket reservation invitation, a ticket purchase transaction relating to a purchase of a ticket for the first upcoming live performance.

24. The system of claim 13 being further operable to cause the at least one processor to execute instructions for:

receiving a first set of user input instructions, the first set of user input instructions being generated from the end user's device in response to user interaction with the Streaming Media GUI, the first set of user input instructions including instructions to initiate a ticket reservation transaction relating to a reservation of a first set of tickets for the first upcoming live performance;

initiating, in response to the first set of user input instructions, a first ticket reservation transaction relating to the reservation of a first set of tickets for the first upcoming live performance;

receiving a second set of user input instructions from the end user's device, the second set of user input instructions including instructions to invite at least one identified recipient to accept at least one of the reserved tickets of the first set of reserved tickets;

notifying, in response to the second set of user input instructions, the at least one identified recipient of a ticket reservation invitation to accept at least one of the reserved tickets of the first set of reserved tickets;

automatically tracking ticket reservation invitation responses from the at least one identified recipient; and generating a third set of instructions for causing a Ticketing graphical user interface ("Ticketing GUI") to be displayed at an end user's device, wherein the third set of instructions include instructions for configuring the Ticketing GUI to enable an end user to access updated ticket reservation status information relating to one or more of the end user's ticket reservations, and to access updated ticket reservation invitation status information relating to one or more of the end user's ticket reservation invitations, wherein the ticket reservation invitation status information includes information identifying which ticket reservation invitations have been accepted, which ticket reservation invitations have not yet been accepted, and/or which ticket reservation invitations have been declined.

* * * * *